United States Patent
Acton et al.

(10) Patent No.: US 11,616,747 B1
(45) Date of Patent: Mar. 28, 2023

(54) SYSTEMS AND METHODS FOR MULTI-AGENT MESSAGING

(71) Applicant: WhatsApp LLC, Menlo Park, CA (US)

(72) Inventors: Brian Lange Acton, Palo Alto, CA (US); Mubarik F Imam, Palo Alto, CA (US); Daniel Charles Cocuzzo, London (GB)

(73) Assignee: WhatsApp LLC, Menlo Park, CA (US)

( * ) Notice: Subject to any disclaimer, the term of this patent is extended or adjusted under 35 U.S.C. 154(b) by 0 days.

(21) Appl. No.: 17/498,149

(22) Filed: Oct. 11, 2021

Related U.S. Application Data

(63) Continuation of application No. 16/773,208, filed on Jan. 27, 2020, now Pat. No. 11,146,519, which is a continuation of application No. 15/945,306, filed on Apr. 4, 2018, now Pat. No. 10,587,551.

(60) Provisional application No. 62/532,305, filed on Jul. 13, 2017.

(51) Int. Cl.
*H04L 51/214* (2022.01)
*H04L 51/216* (2022.01)

(52) U.S. Cl.
CPC .......... *H04L 51/214* (2022.05); *H04L 51/216* (2022.05)

(58) Field of Classification Search
CPC ........................... H04L 51/214; H04L 51/216
USPC ......................................................... 709/206
See application file for complete search history.

(56) References Cited

U.S. PATENT DOCUMENTS

| | | | |
|---|---|---|---|
| 11,146,511 B1* | 10/2021 | Jayaram | ................ H04L 51/216 |
| 11,366,839 B1* | 6/2022 | Ghafourifar | ........ G06F 16/9535 |
| 2012/0124147 A1 | 5/2012 | Hamlin et al. | |
| 2014/0351357 A1 | 11/2014 | Brabec et al. | |
| 2015/0113109 A1 | 4/2015 | Sanjeev et al. | |
| 2015/0117631 A1 | 4/2015 | Tuchman et al. | |
| 2015/0163181 A1 | 6/2015 | Kupsh et al. | |
| 2017/0104863 A1 | 4/2017 | Turim et al. | |
| 2017/0293922 A1 | 10/2017 | Rosenberg et al. | |
| 2017/0295119 A1 | 10/2017 | Rosenberg et al. | |

(Continued)

FOREIGN PATENT DOCUMENTS

JP 2002073486 A 3/2002

OTHER PUBLICATIONS

Extended European Search Report for European Application No. 18832096.4, dated May 4, 2020, 7 Pages.

(Continued)

*Primary Examiner* — Frantz B Jean
(74) *Attorney, Agent, or Firm* — McDermott Will & Emery LLP

(57) ABSTRACT

Systems and methods of the disclosure include receiving a message from a user at a user client device for a multi-agent entity. The message initiates a message thread between the user and the multi-agent entity. An administrator user for the multi-agent entity is determined and the message thread is forwarded to the administrator at an administrator client device. The method facilitates an exchange of security information between the administrator client device and the user client device. The method includes receiving a message thread forwarding a command from the administrator client device to forward the message thread to an agent of the multi-agent entity at an agent client device. The command can comprise a payload containing the security information.

20 Claims, 20 Drawing Sheets

(56) References Cited

U.S. PATENT DOCUMENTS

2019/0058684 A1    2/2019  Morrison et al.

OTHER PUBLICATIONS

International Preliminary Report on Patentability for International Application No. PCT/US2018/027434, dated Jan. 23, 2020, 9 Pages.
International Search Report and Written Opinion for International Application No. PCT/US2018/027434, dated Jul. 31, 2018, 11 Pages.
Office Action dated Jan. 4, 2022 for Japanese Patent Application No. 2020-501556, filed Apr. 13, 2018, 10 pages.
Office Action dated Aug. 30, 2022 for Japanese Patent Application No. 2020-501556, filed Apr. 13, 2018, 4 pages.
Office Action dated May 5, 2022 for Chinese Application No. 201880056263.0, filed Apr. 13, 2018, 11 pages.
Office Action dated Sep. 6, 2022 for Korean Application No. 10-2020-7003490, filed Apr. 13, 2018, 10 pages.

* cited by examiner

*1600*

SYSTEMS AND METHODS FOR MULTI-AGENT MESSAGING

RELATED APPLICATIONS

This application is a continuation of, claims the benefit of and priority to previously filed U.S. patent application Ser. No. 16/773,208 filed Jan. 27, 2020, now U.S. Pat. No. 11,146,519; and entitled "TECHNIQUES FOR MULTI-AGENT MESSAGING", which is a continuation of, claims the benefit of and priority to previously filed U.S. patent application Ser. No. 15/945,306 filed Apr. 4, 2018, now U.S. Pat. No. 10,587,551; and entitled "TECHNIQUES FOR MULTI-AGENT MESSAGING", which claims the benefit of priority under 35 U.S.C. § 119(e) to U.S. Provisional Patent Application No. 62/532,305 filed Jul. 13, 2017, which are hereby incorporated by reference in their entireties.

BACKGROUND

Users may interact with each other in a messaging system, sending messages back and forth to each other in a text-based conversation between two or more users. A user may have a user account associated with them in the messaging system. The user account is an online identity for the user and can be used as a destination for messages directed to the user, and generally for coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

An embodiment of the disclosure can include receiving a message from a user at a user client device for a multi-agent entity. The message can comprise initiating a message thread between the user and the multi-agent entity. The method can include determining an administrator user for the multi-agent entity and forwarding the message thread to the administrator at an administrator client device. The method can include facilitating an exchange of security information between the administrator client device and the user client device. The exchange of securing information can be used to create an end-to-end encrypted messaging relationship between the administrator client device and the user client device. The method can include receiving a message thread forwarding command from the administrator client device to forward the message thread to an agent of the multi-agent entity at an agent client device. The command can comprise a payload containing the security information. The method can also include forwarding the message thread to the agent client device.

Another embodiment of the system can include a processor. The system can include software that can be executed by the processor. The software can cause the system to receive a message from a user at a user client device for a multi-agent entity message. The message can initiate a message thread between the user and the multi-agent entity. The system determines an administrator user for the multi-agent entity. The system forwards the message thread to the administrator at an administrator client device. The system facilitates an exchange of security information between the administrator client device and the user client device to create an end-to-end encrypted messaging relationship between the administrator client device and the user client device. The system receives a message thread forwarding command from the administrator client device to forward the message thread to an agent of the multi-agent entity at an agent client device, the command including a payload containing the security information. The system forwards the message thread to the agent client device.

In yet another embodiment, the disclosure can include non-transitory, computer-readable medium storing software that, when executed by a processor, cause a system to receive a message from a user at a user client device for a multi-agent entity message. The message can initiate a message thread between the user and the multi-agent entity. The system determines an administrator user for the multi-agent entity. The system forwards the message thread to the administrator at an administrator client device. The system facilitates an exchange of security information between the administrator client device and the user client device to create an end-to-end encrypted messaging relationship between the administrator client device and the user client device. The system receives a message thread forwarding command from the administrator client device to forward the message thread to an agent of the multi-agent entity at an agent client device, the command including a payload containing the security information. The system forwards the message thread to the agent client device.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
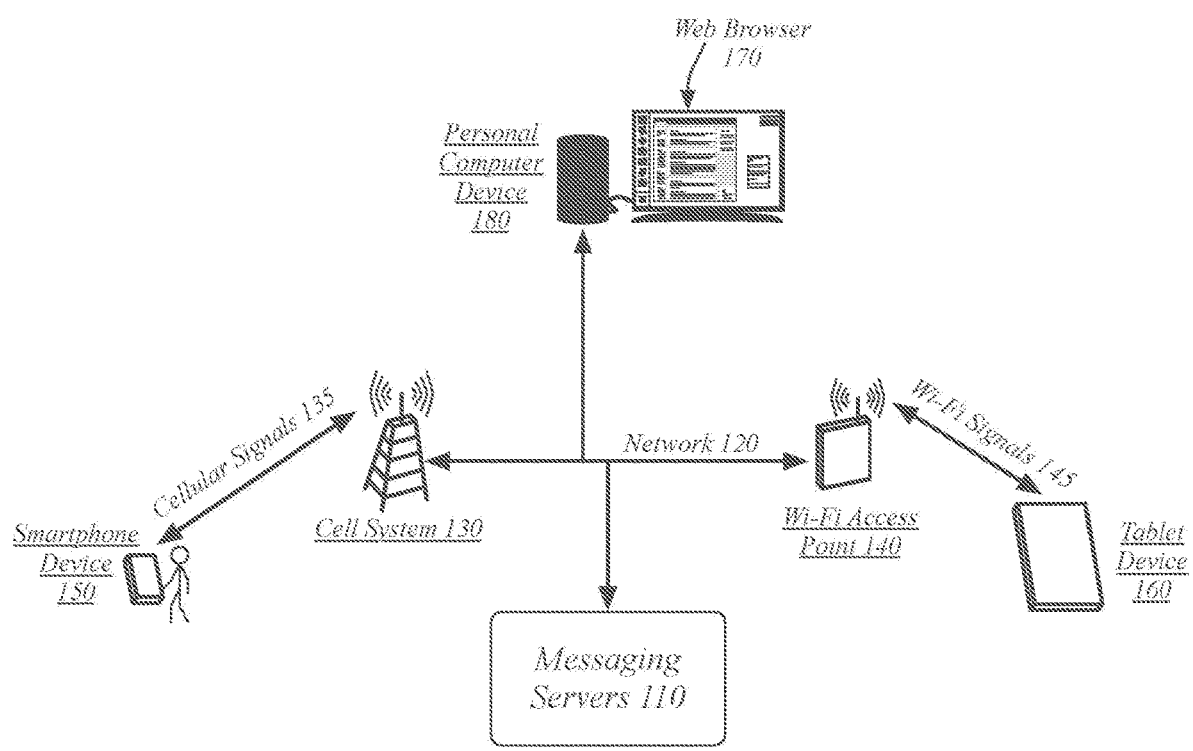
FIG. 1 illustrates an embodiment of a multi-agent messaging system.

Consumers and businesses may connect with each over a messaging system. The messaging system may provide users with a way to message businesses. Users may message businesses to receive support, perform order placement, ask questions, or otherwise interact with a business.

An administrator for a business may be provided with a simple process for signing up with the messaging system. A distinct business application allows agents to separate personal and professional conversations, with personal conversations presented in the consumer application and professional conversations presented in the business application.

The business application may empower access to additional messaging functionality. For example, in association with the performance of end-to-end encryption, a user of the messaging system may be tied to a particular device. However, the business application may empower multiple devices to access messaging communication for a particular business. As such, the process of moving a business's communication onto a messaging system is eased. As a result, the embodiments, can improve the functionality of a messaging system for both businesses and consumers.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a multi-agent messaging system 100. In one embodiment, the multi-agent messaging system 100 may comprise a computer-implemented system having software applications comprising one or more components. Although the multi-agent messaging system 100 shown in FIG. 1 has a limited number of elements in a certain topology, it may be appreciated that the multi-agent messaging system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. In some embodiments, users can select whether a particular message thread uses end-to-end encryption (and thereby receive the additional privacy of the messaging servers being prevented from accessing the contents of messages) or doesn't (and thereby receive the benefit of the messaging system being able to programmatically access messages for the purpose of offering relevant services to the users).

The messaging system may use knowledge generated from interactions between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
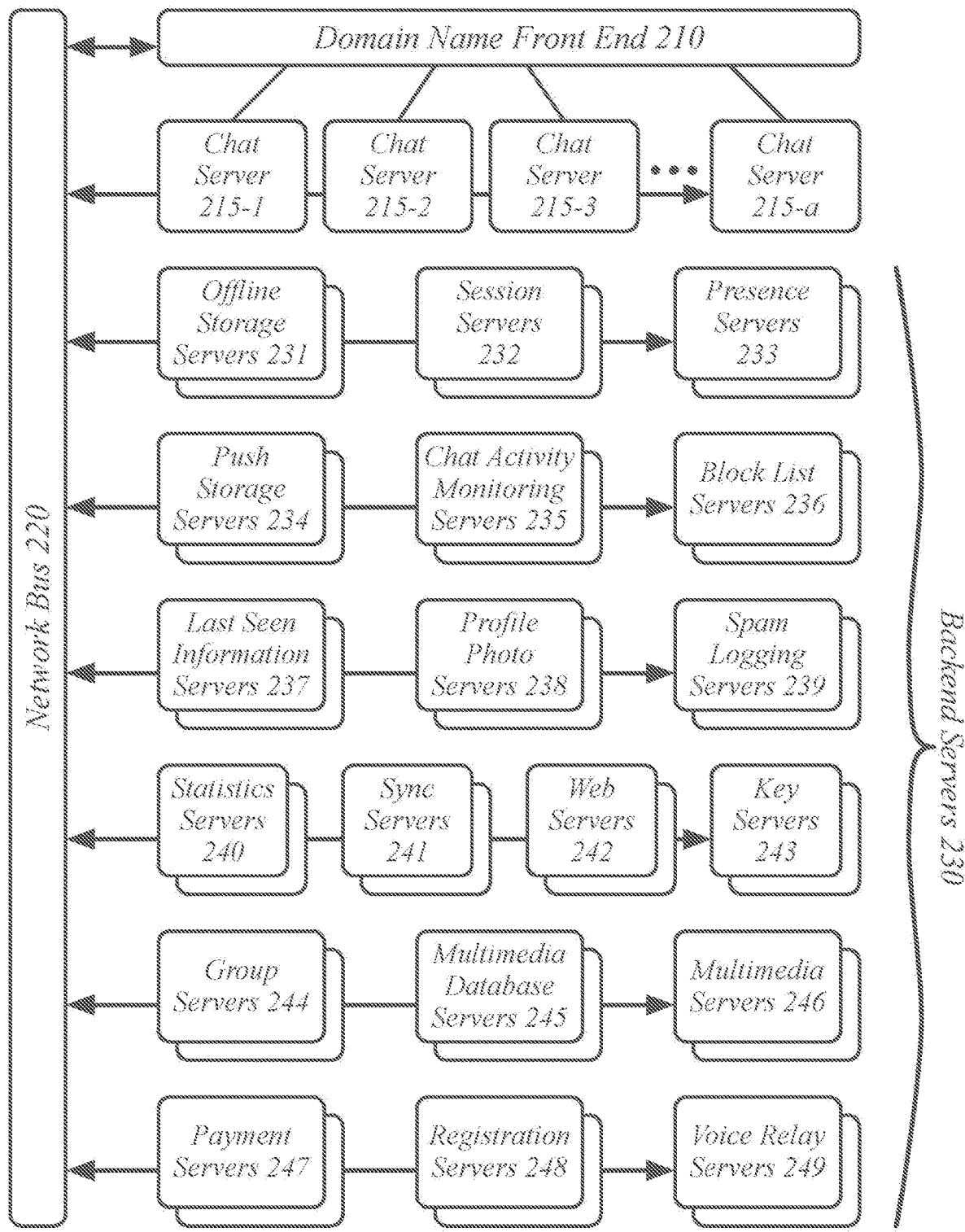
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the multi-agent messaging system 100 with the operations of the multi-agent messaging system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The various servers of the messaging system 200 are connected via a network bus 220. The network bus 220 provides network connectivity between the domain name front end 210, the servers of the messaging system 220, and various external devices, such as client devices. Each of the servers is independently connected to the network bus 220 such that they may independently communicate with each other and/or user devices via the network bus 220.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend servers 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the multi-agent messaging system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3A:
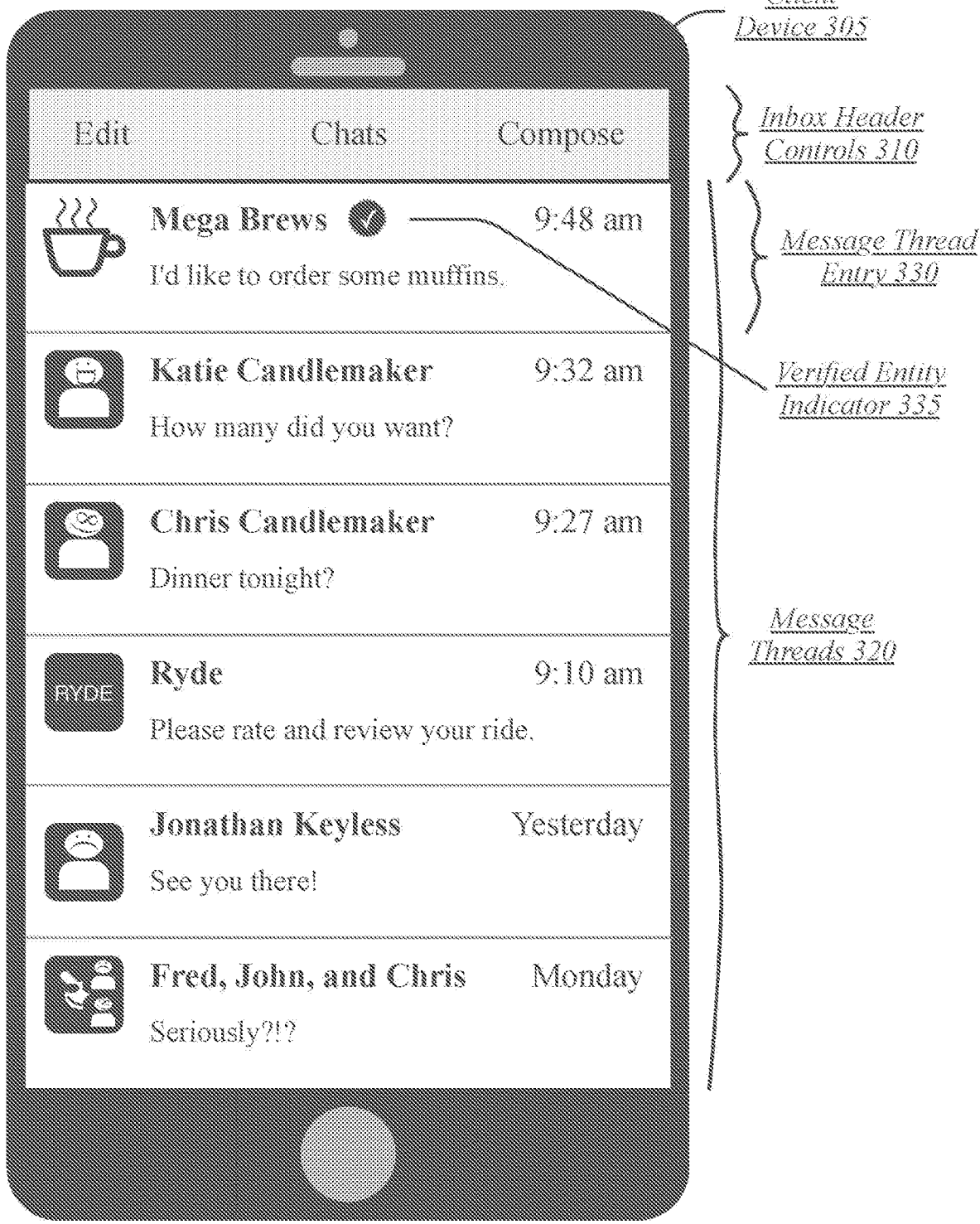
FIG. 3A illustrates an embodiment of a user interface for a message inbox.

FIG. 3A illustrates an embodiment of a user interface 300 for a message inbox.

A client device 305 may correspond to any device used to access a multi-agent messaging system 100. While in the illustrated embodiment of FIG. 3A the client device 305 resembles a smartphone device, it will be appreciated that the techniques described herein may be used with any type of device. The user interface 300 may generally correspond to a display of a user inbox for a messaging system.

The user interface 300 may comprise a display of a plurality of message threads 320 in an inbox for a user account. A portion of displayed message threads 320 may be message threads with unread messages. A portion of displayed threads may be threads without unread messages. In the illustrated embodiment of FIG. 3A, the user interface 300 may be scrolled downwards to reveal more threads.

The display of message threads 320 in an inbox may comprise, for each message thread, a display of a name of a thread, a last-received or last-exchanged messages in the thread, a preview of the contents of the thread, and an avatar for one or more users in the thread. The name of the thread may correspond to the name(s) of one or more participants in the thread other than the name for the user account for the inbox.

A message thread entry 330 for a message thread with a business entity may comprise the name of the business, the last-received message or last-exchanged message in the message thread, a last-received time or last-exchanged time for the last-received message or last-exchanged message in the message thread, and/or other information relating to the message thread. A message thread entry 330 for a message thread with a business entity may comprise a verified entity indicator 335. The verified entity indicator 335 indicates that the listed name of the business entity is for the actual entity being communicated with in the message thread, as represented by its agents.

Messaging partners may be associated with phone numbers used to uniquely identify them. Where a messaging partner is a business entity, it may be associated with a contact number for the business. For general user contacts, the name for the user may be assigned based on an address book for the user on the client device 305. However, for businesses, a verified name may be used, with the verified name provided by the messaging system. The use of this verified name is indicated by the verified entity indicator 335.

The user interface 300 may include inbox header controls 310. The inbox header controls 310 may empower various messaging-related actions. The inbox header controls 310 may comprise an edit control, the edit control empowering configuration of the messaging inbox. The inbox header controls 310 may comprise a compose control empowering the creation of a new message thread.

Figure 3B:
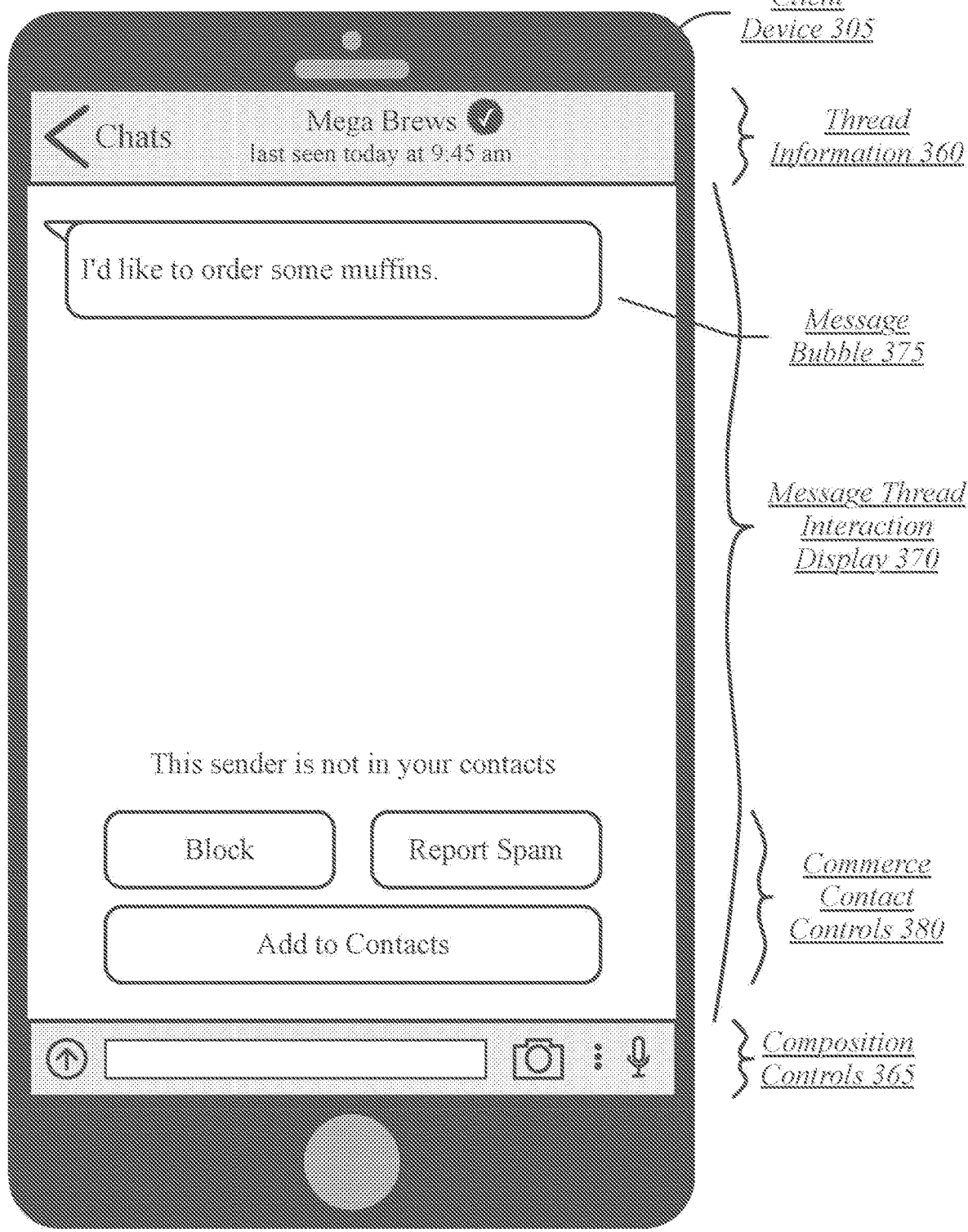
FIG. 3B illustrates an embodiment of a user interface for a message thread.

FIG. 3B illustrates an embodiment of a user interface 350 for a message thread.

The user interface 350 may comprise a user interface for a message thread displayed on a client device 305. At least a portion of the message exchange for the message thread may be displayed in a message thread interaction display 370. A message thread interaction display 370 may comprise a display of one or more messages exchanged by the users of the message thread. The features discussed with regards to a message thread may be applied to either one-on-one message threads or group message threads. The features discussed with regards to a message thread may be applied to a message thread in which a user engages with a business entity.

The user interface 350 may include a display of thread information 360. The thread information 360 may comprise a listing of one or more other users involved in the thread. A display of the one or more other users may use the name of a user, such as a full name, short name, or other name registered as the name for use with a particular user for messaging and/or social-networking interactions. A display of the one or more other users may use an avatar, profile picture, or other visual representation of the one or more other users.

In some instances, a displayed name for a user may comprised a verified name for a business entity. A verified name is a name that has been verified by a managing authority, such as the maintainer of the messaging system, to correspond to an entity. Where a verified name is known for a user, such as a business entity, the verified name may be displayed as part of the thread information 360. However, in some embodiments, the display of a user name may normally be associated as a user interface feature with drawing the name of the user from an address book on the client device 305. As such, a verified name may be displayed with a visual signifier indicating that the name displayed for the user is a verified name according to the managing authority and not a locally-defined name drawn from a viewing user's address book. In some embodiments, a different indicator, a non-verified business indicator, may be displayed where a business hasn't been verified.

The user interface 350 for a message thread may include composition controls 365 that are persistently visible during the display of a message thread. Many, most, or nearly all of the composition controls 365 may empower access to further user interface controls for the performance of various tasks, such as text entry, media selection, emoji selection, camera use, a social approval icon, etc.

Each of the one or more messages may be represented by a particular message bubble, such as message bubble 375. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from a background of a message thread interaction display. A message bubble may have a distinctly-colored border, such as a black outline as depicted, or may have a border defined by the interface between differing colors of the message bubble and the background. In some embodiments, the color or colors of either or both the message bubbles and the background may be customized and configured by users of the messaging system.

The message thread interaction display 370 for a message thread with a business entity may include commerce contact controls 380. The commerce contact controls 380 may be prominently displayed during an initial period of a message thread between a consumer and a business, before a consumer has established a messaging relationship with the business. However, the commerce contact controls 380 may still be accessible after relationship is established.

The commerce contact controls 380 may comprise a block control, a report spam control, and/or an add to contacts controls. The block control may block the business from messaging the consumer. The report spam control may report the business as having engaged in spam. The add to contacts control may add the business to the user's contacts, such as may include adding the business and a phone number for the business to an address book for the user on the client device 305.

The user interface 350 for a message thread may empower a user to perform various other tasks. For instance, a user may be empowered to view a profile for the business associated with the message thread. The profile may comprise a verified profile containing verified information. For example, a verified profile may indicate a verified address, verified location, verified phone number, verified name, verified logo, and/or other verified information. A profile may include information that hasn't been verified, such as an address, location, phone number, name, logo, operating hours, and/or other information.

Administrator Registration

Figure 4:
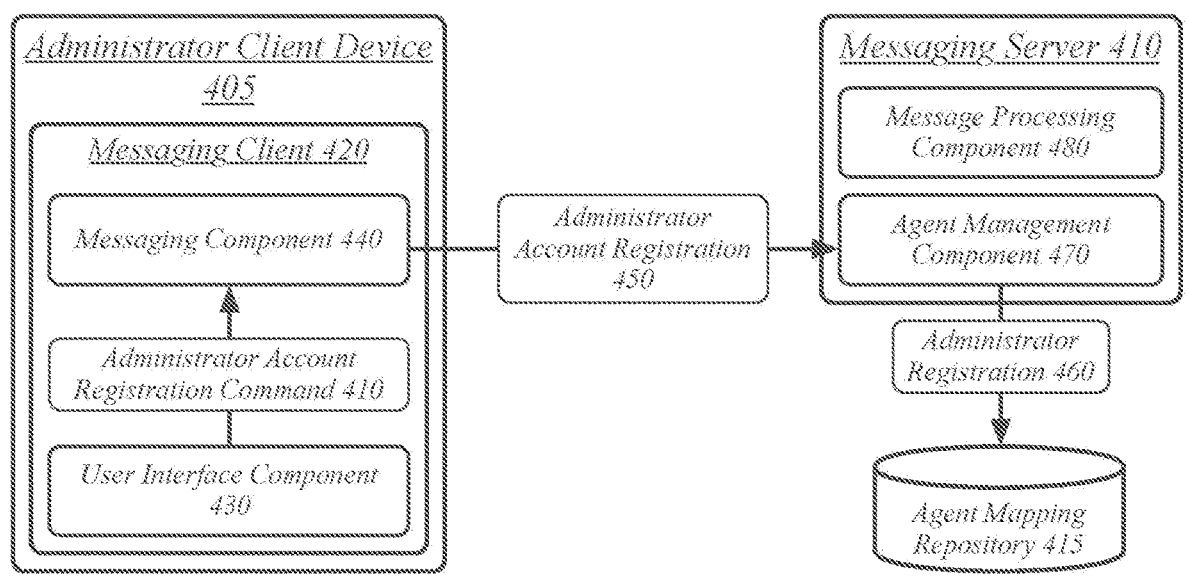
FIG. 4 illustrates an embodiment of the multi-agent messaging system performing an administrator registration.

FIG. 4 illustrates an embodiment of the multi-agent messaging system 100 performing an administrator registration.

The multi-agent messaging system 100 supports a unified messaging platform for a multi-agent entity (e.g., a business entity) with multiple agents. The multi-agent entity may be identified in the multi-agent messaging system 100 based a unique entity identity. The entity identifier may be unique in an identifier namespace for multi-agent entities, such as an identifier namespace for business entities. The entity identifier may be unique across the messaging system in a identifier namespace for different kinds of entities. The entity identifier may be assigned based on random number generation using random number generation techniques (e.g., true randomness, pseudo-randomness). The entity identifier may be derived from other information, such as a contact phone number for a business entity.

A multi-agent entity is associated with one or more agents. The one or more agents are associated with one or more agent client devices. As such, the multi-agent entity may be associated with one or more agent client devices. One or more agents of a plurality of agents for a multi-agent entity may comprise administrators for the multi-agent entity. The one or more administrators are associated with one or more administrator client devices. One or more of the agent client devices may comprise the one or more administrator client devices. As such, the multi-agent entity may be associated with one or more administrator client devices.

Each agent for the multi-agent entity, including any administrators, may be identified according to a device-specific agent identifier. A device-specific agent identifier may comprise a phone number for an agent client device for the agent. Where an agent is associated with multiple client devices, the device-specific agent identifier may comprise a phone number for a primary client device, such as a primary smartphone device for the agent. The agent may be empowered to access the messaging system using a phone client device or a non-phone client device (i.e., a client device without phone connectivity).

The administrator client device 405 may be one of a plurality of client devices communicating using a messaging system and implementing the multi-agent messaging system 100. The administrator client device 405 executes a messaging client 420. The messaging client 420 on the administrator client device 405 comprises a plurality of components. The plurality of components may comprise software components. The components of the messaging client 420 may include additional components to those described here and the operations of the messaging client 420 may be divided between components in different configurations in different embodiments. The administrator client device 405 may execute a business messaging client. A business messaging client may implement the messaging features of the messaging client 420 using interface features designed for use by business users.

The messaging client 420 may comprise a messaging component 440. The messaging component 440 may be generally arranged to perform the interactions between the messaging client 420 and the messaging system. The messaging component 440 may send network communication to and receive network communication from a messaging server 410 for the messaging system.

The messaging client 420 may comprise a user interface component 430. The user interface component 430 may be generally arranged to present information to a user of a client device and receive user commands from the user of the client device. The user interface component 430 may display visual information, output audio information, and otherwise present information to a user. The user interface component 430 may receive touch commands, text commands, voice commands, and any other sort of command for the operation of the messaging client 420.

The multi-agent messaging system 100 includes a messaging server 410. The messaging server 410 may execute on a messaging server device. The messaging server 410 is generally arranged to perform messaging services for client devices. The messaging server 410 may comprise one or more software or hardware components. The messaging server 410 may comprise an agent management component 470. The agent management component 470 is generally arranged to maintain authorizations and registration of agents for multi-agent entities. The message processing component 480 is generally arranged to receive, store, and forward messages between users of the messaging system.

An administrator for a business, business entity, or other multi-agent entity may perform an administrator account registration command 410 using the user interface component 430 of the messaging client 420. The messaging component 440 receives the administrator account registration command 410 and performs an administrator account registration 450 with the messaging server 410 to register an administrator account for the multi-agent entity. The messaging component 440 sends an administrator account registration 450 to the agent management component 470.

The agent management component 470 receives the administrator account registration 450 for an administrator account for the multi-agent entity. The administrator account registration 450 establishes an administrator account for the multi-agent entity. The agent management component 470 registers the administrator account as associated with the multi-agent entity. The administrator account registration 450 may be performed in association with a verification of a multi-agent entity to ensure that a legitimate administrator is empowered to administrate on behalf of the multi-agent entity in the messaging system.

The agent management component 470 performs an administrator registration 460 with an agent mapping repository 415. The agent mapping repository 415 stores a mapping between multi-agent entities and the administrators and agents associated with the multi-agent entity. The agent mapping repository 415 empowers one or more messaging servers to store and retrieve relationships between multi-agent entities and the administrators and agents of the multi-agent entities.

The agent mapping repository 415 may store agent rules for a multi-agent entity. An administrator for the multi-agent entity may specify agent rules for the multi-agent entity using the user interface component 430 for the business application messaging client 420. The agent rules configure the handling of messages for the multi-agent entity. Upon receipt of a message, the message processing component 480 processes the message based at least in part on the agent rules for the multi-agent entity. The agent rules may specify a default set of agents for the multi-agent entity, in which the message processing component 480 automatically includes all of the default agents in any created message thread. The agent rules may specify one or more administrators for the multi-agent entity.

The agent rules may specify a thread locking rule, in which posting messages to, but not reading message from, a message thread is prevented for agents other than a first agent that responds in the message thread. A thread locking rule may specify that administrators are exempt from being prevented from posting.

The agent rules may specify permissions for each agent for the multi-agent entity. The agent rules may specify for each agent whether that agent is a default agent. The agent rules may specify for each agent whether that agent is an administrator. The agent rules may specify for each agent whether that agent has permission to engage in payment activity. The agent rules may specify for each agent whether that agent has permission to engage in particular payment activities, such as approving returns, approving refunds, providing discounts, or other discretionary payment actions. The agent rules may specify for each agent whether that agent has permission to initiate a message thread with users (e.g., customers), rather than only respond to message threads initiated by users.

The messaging system may perform a verification of a business entity as part of a registration process. In general, this verification will indicate that a particular known messaging entity corresponds to a particular known business entity. This may provide user confidence in their messaging experience when a user engages with a business entity. The registration process may include a phone number verification process, in which a short message service (SMS) message or voice confirmation code is sent to the administrator client device 405 and must be entered into the messaging client 420 on the administrator client device 405 in order to complete registration.

Administrators may be empowered to access the messaging system from multiple endpoints. For instance, an administrator may be empowered to access the messaging system from a desktop or laptop computer and from a touch-screen device such as a smartphone. Accessing the messaging system from multiple devices may be empowered by, for instance, having a primary device that manages end-to-end encryption, with the secondary device accessing the messaging system through the primary device.

Agent Registration

Figure 5:
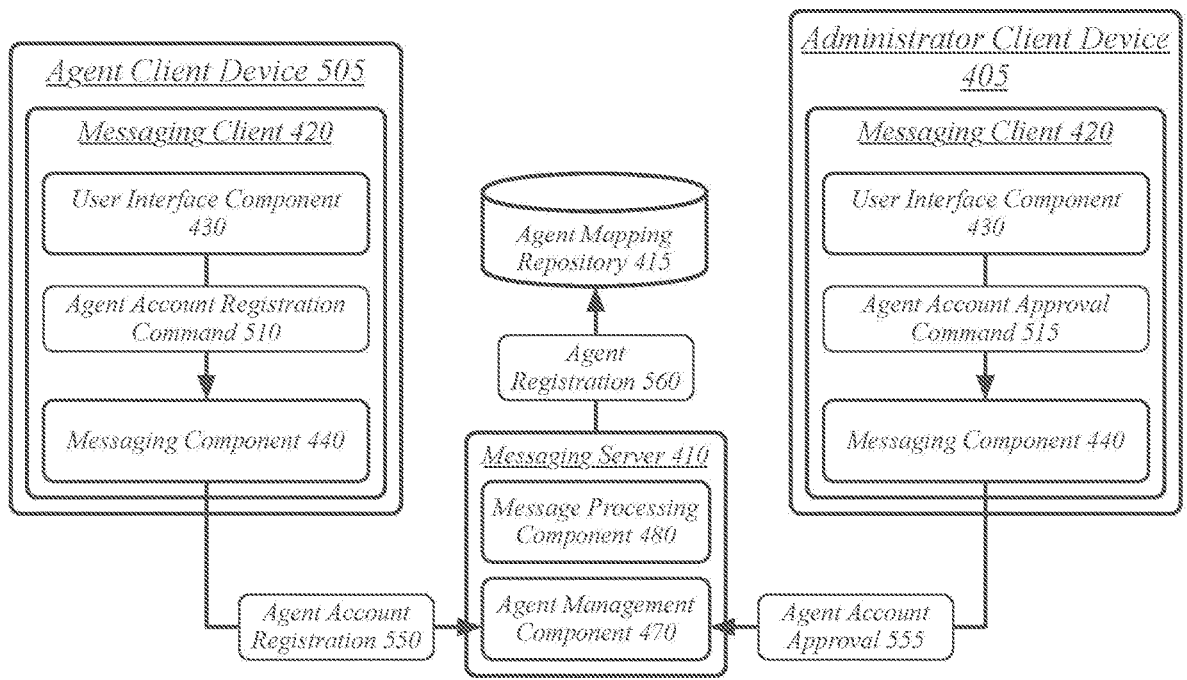
FIG. 5 illustrates an embodiment of the multi-agent messaging system performing an agent registration.

FIG. 5 illustrates an embodiment of the multi-agent messaging system 100 performing an agent registration for an agent using an agent client device 505.

An agent registration may include actions by the agent on an agent client device 505. The user interface component 430 may receive an agent account registration command 510 from the agent and pass the agent account registration command 510 to a messaging component 440. The messaging component 440 then performs an agent account registration 550 with the messaging server 410.

The agent management component 470 receives the agent account registration 550 for an agent account for the multi-agent entity from the agent client device 505. The agent management component 470 performs an agent registration 560 for the agent account with the agent mapping repository 415. The agent registration 560 indicates that the agent account is an agent for a specified multi-agent entity.

In general, the multi-agent messaging system 100 enables administrator approval of an agent registration 560 for the multi-agent entity. In one embodiment, the user interface component 430 on an administrator client device 405 may receive an agent account approval command 515 from the administrator and pass the agent account approval command 515 to the messaging component 440. The messaging component 440 then performs an agent account approval 555 with the messaging server 410.

Alternatively, the administrator may approve an agent registration 560 by providing information to the agent that they can use in the agent registration 560 to indicate that they have been approved. For instance, the administrator may provide a code to the agent that the agent can use with the agent client device 505 to indicate that the agent registration 560 has the approval of the administrator, without the administrator client device 405 sending an agent account approval 555 over a network to the agent management component 470. The agent management component 470 may receive an administrator code in the agent account registration 550 and approve the agent account registration based on the administrator code. The administrator code may be a one-time code provided to the administrator client device 405 by the agent management component 470. The one-time code may comprise a numerical or alphanumerical code. The one-time code may be randomly generated. The one-time code may be provided to the agent client device 505 outside the messaging system.

In some embodiments, a numerical code may be provided via a quick response (QR) code. The QR code, or a numerical code encoded in the QR code, may be provided to the administrator client device 405 by the agent management component 470. The administrator client device 405 may then display the QR code, and the agent client device 505 may capture the QR code with a camera component. The agent client device 505 then extracts the one-time code from the QR code and provides the one-time code to the agent management component 470 in the agent account registration 550.

The agent management component 470 receives the agent account approval 555 for an agent account for the multi-agent entity from an administrator account for the multi-agent entity. The agent management component 470 performs an agent registration 560 for the agent account with the agent mapping repository 415 based on the agent account registration and agent account approval 555. The agent registration 560 indicates that the agent account is an agent for a specified multi-agent entity.

An agent account registration 550, agent account approval 555, and/or agent registration 560 may register the agent account for message sharing authorization of subsequent message threads for the multi-agent entity. The agent account may be authorized to access all messages sent to and from the multi-agent entity. Alternatively, the agent account may be authorized to access message threads started subsequent to the registration of the agent account as an agent for the multi-agent entity. Alternatively, the agent account may be individually authorized to access specific message threads by an administrator for the multi-agent entity. The association of the agent account with the multi-agent entity and authorization of the agent account to access message threads is stored in the agent mapping repository 415.

The registration of the agent account as an agent of the multi-agent entity may prompt the creation of an end-to-end encrypted communication relationship between an agent client device 505 associated with the agent account and an administrator client device 405 associated with the administrator account. The messaging components 440 on the client devices 405, 505 may exchange security information to establish encryption keys for use in encrypting and decrypting communication between the client devices 405, 505. This end-to-end encrypted communication relationship may be used to securely pass information between the agent client device 505 and the administrator client device 405. The end-to-end encrypted communication relationship may be a end-to-end encrypted communication relationship using the same techniques for end-to-end encrypted messaging between devices for the messaging system.

In some embodiments, the agent account registration 550 may comprise a message sharing authorization to access messages sent and received by the multi-agent entity. However, in addition to the agent account registration 550 by the agent, the agent management component 470 may hold from registering an account as an agent of the multi-agent entity until it has an agent account approval 555 from an administrator for the multi-agent entity.

Message Forwarding

Figure 6:
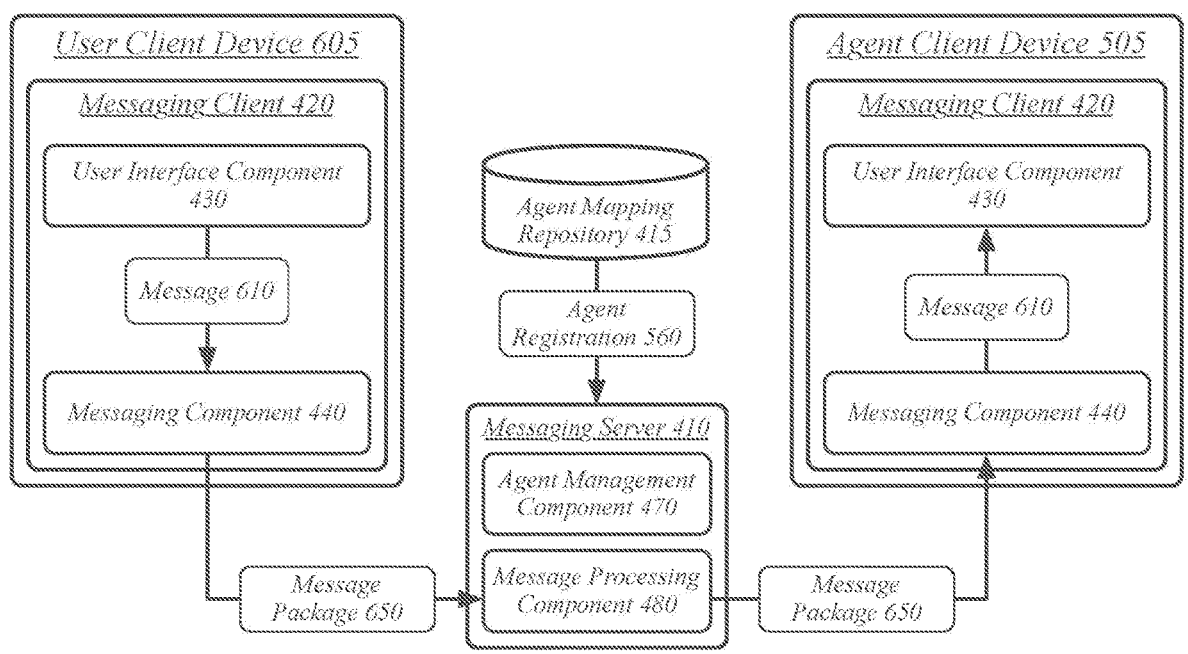
FIG. 6 illustrates an embodiment of the multi-agent messaging system forwarding a message package.

FIG. 6 illustrates an embodiment of the multi-agent messaging system 100 forwarding a message package 650.

A user may use a user client device 605 to send a message 610 to the multi-agent entity. The user composes a message 610 using the user interface component 430 of the user client device 605. The user interface component 430 passes the message 610 to the messaging component 440. The messaging component 440 then generates and submits a message package 650 to the messaging server 410. The message package 650 is addressed to an address or identifier for the multi-agent entity.

A message processing component 480 receives an incoming message 610 in a message package 650 for the multi-agent entity from the user client device 605 associated with a user account. The message processing component 480 then sends the message package 650 with its incoming message 610 to an agent client device 505 associated with a registered agent account based on a message sharing authorization for the agent account by an administrator account. In some embodiments, message sharing authorization may be provided based on the registration of the agent. In other embodiments, message sharing authorization may be provided individually for specific message-threads with administrators individually authorizing agents to read and participate in message threads.

In some embodiments, the agent is empowered to access all message threads for the multi-agent entity, or all message threads created subsequent to their being registered as an agent for the multi-agent entity. In other embodiments, the agent is empowered to access specific message threads by an administrator and prevented from accessing message threads that they haven't been specifically authorized to access. In some embodiments, agents may read any message thread, but only submit messages to the message threads that they are specifically authorized by an administrator to write in. In some embodiments, a message thread may be locked to a particular agent, preventing other agents from posting in it, once the agent has posted in the message thread. Such a lock may be indicated in an agent interface in the business application.

In some embodiments, incoming message threads may be directed to one or more default accounts for the multi-agent entity. An agent account may therefore comprise a default account to which all incoming message thread are initially directed by default. A default account or default accounts may be specified when a multi-agent entity is registered or be configured or reconfigured later. In some embodiments, a default agent may be an administrator, thereby empowering the administrator to respond to some of the incoming message threads and distribute the remaining to various agents for handling. An administrator may use the administrator client device 405 to forward a message thread from the administrator client device 405 to the agent client device 505 vis the messaging server 410.

The agent mapping repository 415 comprises a list of agents for each multi-agent entity. The agent mapping repository 415 may further comprise a list of default agents for the multi-agent entity, wherein the default agents are the default recipients of incoming messaging communication from a user client device. The list of one or more default agents may be specified by an administrator for the multi-agent entity. The agent mapping repository 415 may further store a list of one or more administrators for the multi-agent entity. Administrators are a subset of agents with additional powers, such as being empowered to add agents, to remove agents, and/or to assign message threads to agents, without limitation.

The agent management component 470 receives the message-thread forward for a message thread between a user account and an administrator account. The message-thread forward is received from the administrator account, such as from an administrator client device 405. The message-thread forward is addressed to the agent account that is being forwarded the message thread. The message-thread forward may comprise or be sent in association with a message sharing authorization for the agent account to access the message thread in embodiments in which agent accounts are not authorized to access all message threads for the multi-agent entity. The agent may be notified by the agent management component 470 that they have been assigned a message thread via the agent client device 505.

The agent management component 470 registers the message thread with the agent account in the agent mapping repository 415. This empowers the message processing component 480 to forward incoming messages for the message thread to the proper client device, in this case the agent client device 505 for the agent account assigned the message thread. When the message processing component 480 then receives an incoming message 610 in an incoming message package 650 for the multi-agent entity from the user client device 605 at the messaging server 410 on the messaging server device, it sends the message 610 in the message package 650 to the agent client device 505 based on the registering of the message thread with the agent account in the agent mapping repository 415. The message thread for the incoming message 610 is determined based on the multi-agent entity addressed by the message 610 and the agent registration 560 indicating the appropriate agent client device 505 is retrieved from the agent mapping repository 415 based on the message 610 being associated with the message thread assigned to the agent client device 505.

When an incoming message package 650 is received, the message package 650 is examined to identify the intended recipient. The intended recipient is identified based on a recipient identifier. Where the intended recipient is a multi-agent entity, the recipient identifier identifies the multi-agent entity. The recipient identifier may then be used with the agent mapping repository 415 to retrieve an agent that should receive the message package 650, with the agent having been registered with the multi-agent entity based on an agent registration 560. In some cases, the agent is identified based on their agent account being registered as the handling agent for a message thread for the message package 650. The message thread for the message package 650 may be identified based on the sender, with the message thread being a unique message thread between the user account for the user client device 605 of the sender and the recipient multi-agent entity. In other cases, the agent is identified based on the agent account being a default agent, with a default agent being used due to no agent being specifically assigned to the message thread. In either case, the message package 650 is then sent to the agent client device 505 for the determined agent.

An initial creation of a message thread between a user client device 605 and an agent client device 505 may be performed where a default agent receives the initial message thread creation of all incoming user communication. The user client device 605 and agent client device 505 may create an end-to-end encrypted messaging relationship, with each client device 405, 505 storing security information for the messaging relationship. The security information may comprise one or more encryption keys, with an incoming message 610 encrypted based on an encryption key of the one or more encryption keys.

Where more than one agent client device is authorized to access a message thread with a user client device 605, the message thread may be secured as a secure group message thread. A secure group thread supports encrypted communication between three or more client devices using end-to-end encryption. Where an incoming message 610 is sent to a group message thread, the incoming message 610 is individually encrypted for each recipient client device, such as for two or more agent client devices.

In some embodiments, the assignment of a message thread from one agent client device (such as a default agent client device used by an administrator for the multi-agent entity) may prompt the transition of a message thread from a one-to-one message thread to a group message thread. In other embodiments, the message thread may be initially created as a group message thread. In particular, where multiple agents are automatically authorized to access the message thread, the message thread may be initially created as a group message thread, with each agent client device for an agent authorized to access every message thread participating in the group message thread. Alternatively, agent client devices may be added to the group message thread in response to the agent client device requesting to access a message thread that it is authorized to access. In these embodiments, a message thread may be transitioned to a group message thread in response to a second agent client device requesting to access to the message thread with a user.

A message-thread forward from a first agent client device to a second agent client device may comprise a forward of a history bundle for the message thread. The first agent client device—such as the agent client device for a default agent—may encrypt the existing conversation as the history bundle and send the encrypted history bundle to the second agent client device to provide the second agent a context for continuing an interaction with the user.

Global View

In embodiments in which multiple client devices, such as all agent client devices, are to receive all message threads for the multi-agent entity, the message processing component 480 may automatically forward all message packages for all message threads for the multi-agent entity to all agent client devices for the multi-agent entity. For each incoming message package 650, the message processing component 480 retrieves a list of agent registrations, comprising an agent registry, from the agent mapping repository 415 and forwards the message package 650 to each of the agent client devices. This message package 650 may thereafter be decrypted by each of the agent client devices based on encryption keys established for decrypting message packages from the user client devices according to encrypted group message thread techniques.

A message thread may be displayed on the user client device 605 in a message thread interface. In order to assist the user in identifying the multi-agent entity with which they are corresponding, the multi-agent messaging system 100 may label the message thread interface on the user client device 605 to indicate the multi-agent entity. For example, the message thread interface on the user client device 605 is labeled with a verified name for the multi-agent entity, such as the name of a business.

In some embodiments, message threads are labelled for users based on the individual agent with which the users are corresponding. As such, the agent management component 470 may re-label a message thread interface for the message thread on the user client device 605 to indicate the agent account in place of the administrator account in response to a message-thread forward command form the administrator account to the user account. As such, in an initial period the message thread interface may display user information for the administrator account and then in a subsequent period display user information for the agent account. In some embodiments, a label for an administrator or agent being communicated with may be withheld until an administrator or agent submits a message to the message thread, so as to avoid confusing a communicating user. As such, in an initial period a name of the multi-agent entity may be used and then in a subsequent period a specific name of an agent is used once the agent sends a message within the message thread, such as after the agent is assigned the message thread by an administrator.

The messaging client 420 may display a last-seen time for contacts. These last-seen times may be displayed in a messaging inbox view for each message thread. These last-seen times may be displayed in the message thread interface for a message thread with a contact. For a multi-agent entity, the last-seen time used may be the latest (i.e., the most recent) last-seen time for any agent with authorization to access the message thread. The agent management component 470 may determine a plurality of last-seen times for a plurality of agent accounts for the multi-agent entity, select a most-recent last-seen time of the plurality of last-seen times, and provide the most-recent last-seen time to a message thread interface for the message thread on the user client device 605 to indicate a last-seen time for the multi-agent entity.

In some embodiments, administrator and/or agents for a multi-agent entity, business entity, or other empowered entity may be empowered to send broadcast messages to multiple user accounts. For example, the multi-agent entity may be able to send a specified message to every user account with which the multi-agent entity has an active or recently-active message thread. The messaging system may impose a limit, such as a daily limit, on the number of broadcast messages that may be sent. Users may be empowered to opt-out of receiving broadcast messages for any specific or from all businesses. Users may be allowed to opt-in to the receiving of any broadcast messages or to broadcast messages for a particular business.

Tagging Messages

In some embodiments, administrators and/or agents may be empowered to tag users with notes, labels, or other pieces of information. Administrators may thereafter send broadcast messages to only those users with a particular tag. These tags may be visible to multiple agents and/or administrators, empowering the sharing of information. For example, agents may add notes to message thread visible to other agents to aid in the performance of various tasks. Agents and administrators may be empowered to sort and select message threads based on tags. Agents and administrators may be presented with a hierarchical structure based on at least some of the tags.

Message threads with users may be automatically tagged with a tag providing context for how the user initiated the message thread. For example, a messaging-context tag may indicate that the user selected an deep-link uniform resource indicator (URI) on a web page or in an application that deep linked to the multi-agent entity in the messaging client 420. A messaging-context tag may indicate that the user selected an advertisement comprising a deep-link URI.

In some embodiments, tagging message threads may include tagging the message threads with media content, such as images or videos. In these embodiments, the messaging system may provide a media repository that may be used to store media content that messages threads have been tagged with. This media repository may be encrypted so that only administrators and agents of the multi-agent entity can access the media content associated with the multi-agent entity. In some embodiments, only agents selected by an administrator or other agent may be authorized to access media content.

Automated Responses

In some embodiments, the messaging system may support automated responses. For instance, an automated response may be sent when a user creates a message thread with a multi-agent entity to welcome the user, with the automated response defined by an administrator for the multi-agent entity. Automated responses may be set up by an administrator to answer frequently-asked questions. These automated responses may be provided in response to user messages based on various natural language processing (NLP) techniques, including explicit keyword tagging, keyword analysis, machine-based natural language learning, or any other NLP technique. The messaging system may also provide automated response shortcuts to agents viewing a message thread. Instead of automatically sending an automated response, the messaging system may provide one or more suggested responses to the agent. These suggested responses may be general suggested responses provided without context to the specifics of the message thread, or may be based on the contact of the message thread, as may include NLP analysis of the message thread.

Analytics

The multi-agent messaging system 100 may provide analytics to administrators and/or agents of a multi-agent entity. Analytics may provide various measures for various metrics providing information about the performance of the multi-agent entity on the messaging system. Analytics may include, without limitation, response time measures and satisfaction measures. Analytics may include read and response rates for broadcast messages. Analytics may be provided generally for the multi-agent entity and/or for the performance of various administrators and/or agents.

Administrators may be provided with a dashboard showing administrator-relevant information. Administrator-relevant information may include alerts. For instance, if a user message has gone without response for greater than a defined period of time. The period of time used to generate an alert may vary depending on how a message is tagged, such as a higher-priority message tagged with a high-priority tag causing an alert with less time without a response than a lower-priority message. In some embodiments, an administrator may be provided with a list of high-priority message threads with messages that have not been responded to.

Payment Processing

The multi-agent messaging system 100 may support payment processing on behalf of consumers and businesses, with the multi-agent messaging system 100 acting as an intermediary in a payment process.

De-Authorization

Administrators and agents may also be de-authorized from accessing message threads and other information for the multi-agent entity. Administrators may deauthorize agents by sending a deauthorization command to the agent management component 470. Where multiple administrator accounts are used for a multi-agent entity, a primary administrator account may control the authorization and deauthorization of other administrator accounts. The deauthorization of a primary administrator may be performed manually be administrators of the messaging system based on communication with the multi-agent entity.

Security Information Sharing

In an alternative embodiment, access to an end-to-end encrypted message thread may be provided by sharing security information between devices. An initial creation of a message thread between a user client device 605 and an administrator client device 405 may be performed where the administrator receives the initial message thread creation of all incoming user communication. The user client device 605 and administrator client device 405 may create an end-to-end encrypted messaging relationship, with each client device 405, 605 storing security information for the messaging relationship. The security information may comprise one or more encryption keys, with an incoming message 610 encrypted based on an encryption key of the one or more encryption keys.

This security information may be sent from the administrator client device 405 to the agent client device 505 to empower the agent client device 505 to decrypt the messages sent by the user client device 605 to the message thread with the multi-agent entity and to empower the agent client device 505 to encrypt messages sent to the user client device 605 from the agent client device 505. The message processing component 470 forwards a thread forwarding payload from the administrator account to the agent account based on the message thread forward command. The thread forwarding payload comprises the security information, such as encryption keys, empowering the agent client device 505 to access the message thread.

The messaging component 440 on the administrator client device 405 collects the security information, such as encryption keys, from a security information repository on the administrator client device 405. The administrator client device 405 then sends the security information to the agent client device 505. The sending of the security information to the agent client device 505 by the administrator client device 405 may be performed in response to a message thread being assigned by the administrator to the agent. The agent client device 505 receives the security information and stores it in its own security information repository. The agent client device is then empowered to encrypt and decrypt communication with the user client device 605 using the security information provided by the administrator client device 405. The sending of the security information from the administrator client device 405 to the agent client device 505 may be performed using end-to-end encrypted communication between the client device 405, 505.

With the security information exchanged and the agent client device 505 registered as the replacement recipient for the message thread with the user client device 605 in the agent mapping repository 415, the agent client device 505 is therefore prepared to both receive the message package 650 from the message processing component 480 and to decrypt the message 610 stored within using the security information. Similarly, the agent client device 505 is prepared to send messages in association with the message thread to the user client device 605 using the security information and the message forwarding functionality of the messaging server 410.

In embodiments where an agent for a multi-agent entity is automatically authorized to access message threads for the multi-agent entity, either all threads or subsequent threads, security information for the message threads may be automatically provided to the agent client device 505 in response to a message thread being created. When a message thread is created between a user and the multi-agent entity, security information, such as encryption keys, are established on the user client device and a client device for the multi-agent entity. A primary administrator client device registered for the multi-agent entity is selected to receive a request to create an end-to-end encrypted message thread. The administrator client device 405 and user client device 605 establish an end-to-end encryption relationship where each client device 405, 605 has encryption keys for use in encrypting and decrypting messages sent between the client devices 405, 605. To empower agent client devices in accessing the message thread, the security information on the primary administrator client device 405 is forwarded to all the agent client devices for agents registered in the agent mapping repository 415. The administrator client device 405, once the security information is established, sends it to the agent client devices as an thread access payload comprising security information for the message thread. The thread access payload is distributed to each of the agent client devices, thereby empowering the messaging clients on each of the agent client devices to decrypt and read messages in the message thread. The thread access payload is encrypted according to end-to-end encryption techniques between the administrator client device 405 and the agent client devices.

Group Message Thread Encryption

Figure 7:
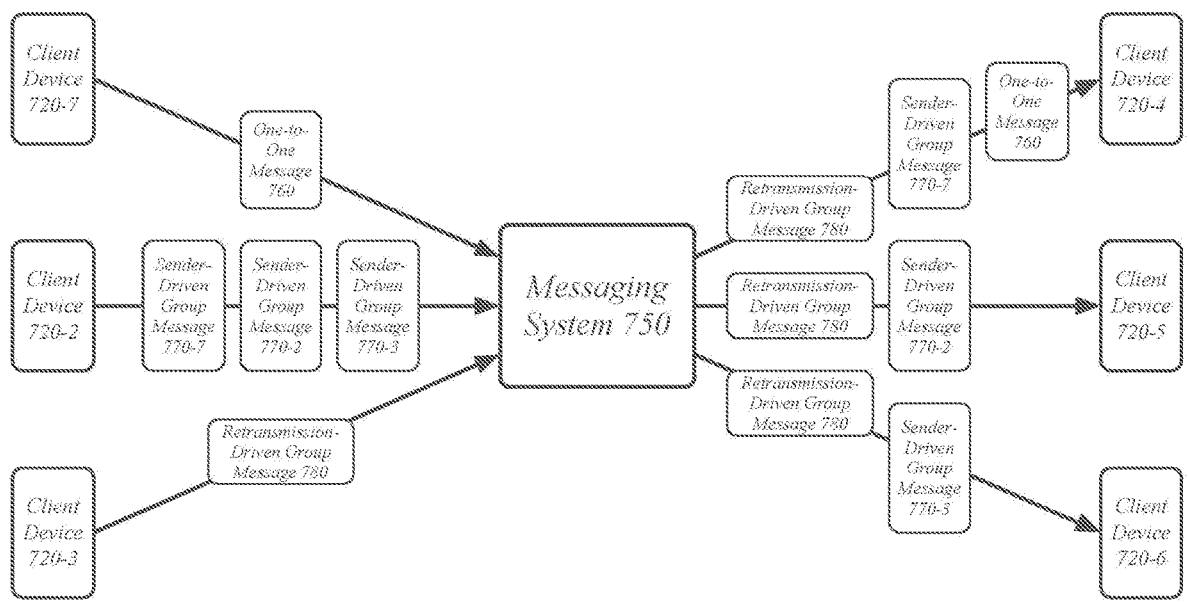
FIG. 7 illustrates an embodiment of an end-to-end encrypted communication system.

FIG. 7 illustrates a block diagram for an end-to-end encrypted communication system 700. The end-to-end encrypted communication system 700 may comprise a multi-agent messaging system 100. The end-to-end encrypted communication system 700 may support end-to-end encrypted group messages, such as may be used to empower multiple agents to access a message thread with a user client device.

A plurality of client devices 720 may operate as part of the end-to-end encrypted communication system 700, transmitting messages between each other via the messaging system 750. The client devices 720 may comprise one or more mobile devices, personal computer devices, portable computer devices, desktop computer devices, tablet devices, smartphone devices, and/or any other form of computer devices. Each of the client device 720 may be associated with a particular user of the messaging system 750, such as may include consumers, agent, and administrators, without limitation.

A first client device 720-1 may transmit a one-to-one message 760 via the messaging system 750. A one-to-one message 760 may comprise a message sent from a single sender client device to a single recipient client device. Because only a single recipient is specified the messaging system 750 may not perform a fan-out or duplication of the one-to-one message 760 to multiple recipients but instead forward the one-to-one message 760 to its recipient client device 720-4 when the recipient client device 720-4 is available.

The one-to-one message 760 may be encrypted for transmission between the sender client device 720-1 and recipient client device 720-4. The one-to-one message 760 may be encrypted according to an asymmetric encryption key using a public/private key relationship. The messaging system 750 may be operative to store and distribute one or more public keys for recipient client devices to one or more client devices with messages to send the recipient client devices. The recipient client device 720-4 may store a public key with the messaging system 750. The messaging system 750 may provide the public key to the sender client device 720-1 to use in encrypting the one-to-one message 760 and other messages for the recipient client device 720-4. The recipient client device 720-4 may keep the private key counterpart to the distributed public key as a secret on the recipient client device 720-4. A one-to-one message 760 may be encrypted using the public key and thereby be transmitted to the recipient device 720-4 via the messaging system 750 without the messaging system 750 being able to decrypt the one-to-one message 760.

A plurality of sender-driven group messages 770 may correspond to one solution to sending group messages—messages directed to more than one recipient—using the messaging system 750. The sender client device 720-2 may transmit a sender-driven group message to each of the recipient client devices 720-4, 720-5, and 720-6 through an individual submission of each of the sender-driven group messages 770 to the messaging system 750 for each of the recipient client devices 720-4, 720-5, and 720-6. It will be appreciated that more than three recipient client devices may be specified. Each of the sender-driven group messages 770 may be encrypted using an encryption key, specific to each of the plurality of recipient client devices, one encryption key for each from a plurality of encryption keys corresponding to a plurality of recipient client devices. This may prevent the messaging system 750 from reading the contents of any of the sender-driven group messages 770. Because each of the sender-driven group messages 770 was individually addressed to and for delivery to a particular recipient client device, a public key for each of the recipient client devices 720-4, 720-5, and 720-6 may be forwarded from the recipient client devices 720-4, 720-5, and 720-6 to the sender client device 720-2 by the messaging system 750, with each of the recipient client devices 720-4, 720-5, and 720-6 remaining the only device capable of decrypting the particular sender-driven group message transmitted to it by virtue of maintaining the private key corresponding to its shared public key as a secret.

However, the sending of the individual sender-driven group messages 770 by the client device 720-2 may, as a consequence, use a quantity of data transmitted over a data connection for the sender client device 720-2 that scales upwards as a multiple of the number of recipient client devices. This may involve a significant waste of upload bandwidth for the sender client device 720-2 and download bandwidth for the messaging system 750 in excess of what would be used were only one copy of a group message to be transmitted to the messaging system 750 by the sender client device 720-2.

A retransmission-driven group message 780 may correspond to another solution to sending group messages using the messaging system 750. The sender client device 720-3 may transmit a retransmission-driven group message 780 to each of the recipient client devices 720-4, 720-5, and 720-6 through a single submission of the retransmission-driven group message 780 to the messaging system 750, with the messaging system 750 responsible for distribution a copy of the retransmission-driven group message 780 to each of the recipient client devices 720-4, 720-5, and 720-6. Because a single retransmission-driven group message 780 is submitted to the messaging system 750, any encryption applied to the retransmission-driven group message 780 will be the same for each recipient. As such, each of the recipient client devices 720-4, 720-5, and 720-6 should be configured with a shared encryption key known to all of the recipient client devices 720-4, 720-5, and 720-6.

However, unlike with the one-to-one message 760 or sender-driven group messages 770, the use of a private asymmetric key by the sender client device 720-3 presents the problem that each of the recipient client devices 720-4, 720-5, and 720-6 would need to have the corresponding private key. Whether symmetric or asymmetric encryption is used, each of the recipient client devices 720-4, 720-5, and 720-6 must have the same encryption key if the same retransmission-driven group message 780 is to be decrypted by all of them. However, the messaging system 750 must be prevented from having access to the encryption key shared by the recipient client devices 720-4, 720-5, and 720-6. As such, the encryption key shared between the recipient client devices 720-4, 720-5, and 720-6 for decrypting the retransmission-driven group message 780 must itself be encrypted when shared between the recipient client devices 720-4, 720-5, and 720-6.

The sender client device 720-3 may therefore use one-to-one encryption to transmit a shared encryption key to the recipient client devices 720-4, 720-5, and 720-6. A shared encryption key may be encoded in a message sent as a plurality of sender-driven group message similar to the sender-driven group messages 770 as discussed with reference to client device 720-2. The shared encryption key may thereby be transmitted from the sender client device 720-3 to the recipient client devices 720-4, 720-5, and 720-6 without the messaging system 750 being able to access the shared encryption key. Messages, such as retransmission-driven group message 780, sent from the sender client device 720-3—or from any client device with access to the shared encryption key—may thereafter be encrypted using the shared encryption key, with any of sender client devices 720-3 and recipient client devices 720-4, 720-5, and 720-6 able to decrypt the messages, but the messaging system 750 remaining unable to decrypt the messages. A symmetric encryption key may be used as the shared encryption key as the benefit of an asymmetric private/public key pair may not be relevant where a shared key is only distributed among devices authorized to decrypt any messages encrypted using it, while asymmetric encryption may use more computational resources to encrypt and decrypt than symmetric encryption.

Figure 8:
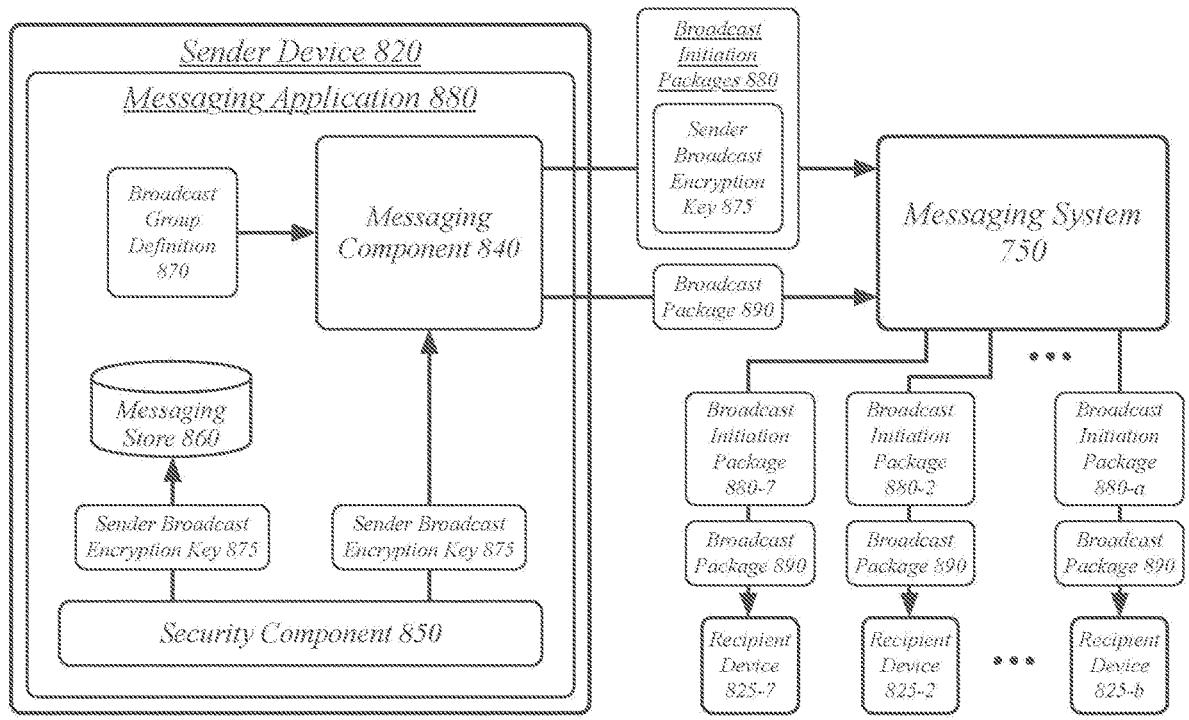
FIG. 8 illustrates an embodiment of sender device instantiating a group broadcast.

FIG. 8 illustrates an embodiment of sender device 820 instantiating a group broadcast. The sender device 820 may comprise a messaging application 830. The messaging application 830 may comprise a messaging component 840, security component 850, and messaging store 860. The sender device 820 may comprise the user client device 605 for an interaction with the multi-agent entity The messaging component 840 may be operative to receive a broadcast group definition 870 at a sender device, the broadcast group definition 870 defining a broadcast group comprising a plurality of recipient devices 825. In some cases, the broadcast group definition 870 may be received from a user messaging interface on the sender device 820. The messaging application 830 may present a user messaging interface to the user of the sender device 820. The user messaging interface may empower the user of the sender device 820 to specify the recipient or recipients of a message and to initiate or respond to an individual or group messaging interaction. The user of the sender device 820 may specify the broadcast group by selecting a plurality of contacts or other recipient identifiers that correspond to the recipient devices 825.

The broadcast group definition 870 may be the list of default agents for a multi-agent entity. The agent client devices for the multi-agent entity correspond to the recipient devices 825. Where a user of a sender device 820 requests to communicate with a multi-agent entity, the sender device 820 may be provided with a list of default agent client devices for the default agents for the multi-agent entity. The list of default agent client devices for the multi-agent entity is then used as the broadcast group definition 870 to initiate encrypted group messaging with the default agents of the multi-agent entity. Each of the default agent client devices is similarly provided with a broadcast group definition comprising the other default agent client devices and the user client device.

The broadcast group definition 870 may additionally or alternatively include non-default agent client devices for non-default agents. Where a group message thread is created at initiation of messaging between the user and the multi-agent entity, the broadcast group definition 870 may include only the default agents. However, where a messaging initiation is with a single default agent, then a one-to-one message thread may be initially created, with the group message thread created in response to a non-default agent being assigned to the message thread. Once the non-default agent is assigned, the group message thread creation is initiated, and therefore includes the single default agent and one or more assigned non-default agents.

In an alternative case, the broadcast group may be defined by the user of another client device, such as one of recipient devices 825. The sender device 820 may have received a group message from another client device, such as one of the recipient devices 825. The sender device 820 may have presented the group message to the user of the sender device 820 and received a response to the group message from the user for transmission to the group. As such, in some cases, the broadcast group definition 870 may be specified by the user responding to a group message in which they were included or otherwise may have been initially determined by a user of another client device.

In one embodiment, the broadcast group may be defined by the messaging system 750 to include the user client device 605 and one or more agent client devices authorized to access the message thread with the user client device 605. In some cases, this may comprise every agent client device for the multi-agent entity. The messaging system 750 may provide a list of agent client devices to the sender device 820, with the sender device 820 then instantiating the broadcast group definition 870 based on the list of agent client devices. The membership in the broadcast group may be updated, with the sender device 820 providing encryption keys to added agent client devices when requested to do so. For example, a recipient device may be added when a non-default agent client device is added in response to a non-default agent being assigned or otherwise authorize to access the message thread with a user.

The security component 850 may be operative to generate a sender broadcast encryption key 875 at the sender device 820. The sender broadcast encryption key 875 may be generated randomly within predefined parameters for the end-to-end encryption system 700. For example, where a thirty-two byte key is used, a random thirty-two byte number be generated. In some embodiments, randomly-generated keys may be subject to criteria or testing according to known techniques prior to use as a sender broadcast encryption key 875. The sender broadcast encryption key 875 may comprise a symmetric encryption key. The sender broadcast encryption key 875 may correspond to the shared encryption key discussed with reference to FIG. 7. The security component 850 may store the sender broadcast encryption key 875 in a messaging store 860 in association with the broadcast group for retrieval for future communication with the broadcast group.

The messaging component 840 may be operative to generate a broadcast initiation package. The broadcast initiation package may contain the sender broadcast encryption key 875. In some embodiments, the broadcast initiation package may contain a group broadcast message. The messaging component 840 may receive the group broadcast message via a user messaging interface. The group broadcast message may comprise at least one of a text segment or media item. The group broadcast message may be addressed to the broadcast group corresponding to the broadcast group definition 870. The messaging component 840 may generate the broadcast initiation package in response to receiving the group broadcast message via the user messaging interface, the broadcast initiation package to perform both the delivery of the group broadcast message and the delivery of the sender broadcast encryption key 875 for use in the encryption of future group messages.

The messaging component 840 may be operative to transmit the broadcast initiation package to the plurality of recipient devices 825, wherein each of the plurality of recipient devices 825 is transmitted the broadcast initiation package encrypted according to a recipient-device-specific encryption key. Each of the recipient devices 825 may be associated with a different recipient-device-specific encryption key, with each of the recipient-device-specific encryption keys being used—one for each—to encrypt a copy of the broadcast initiation package for delivery to each of the recipient devices 825 as broadcast initiation packages 880. The recipient-device-specific encryption keys for each of the plurality of recipient devices 825 may comprise asymmetric encryption keys. The broadcast initiation package may be transmitted to the recipient devices 825 via the messaging system 750. Alternatively, the recipient-device-specific encryption keys for each of the plurality of recipient devices 825 may comprise recipient-device-specific symmetric encryption keys, wherein the recipient-device-specific symmetric encryption keys are established using recipient-device-specific asymmetric encryption keys.

The messaging component 840 may be operative to transmit a broadcast package 890 to a messaging system 750, the broadcast package 890 addressed to the broadcast group, the broadcast package 890 encrypted according to the sender broadcast encryption key 875. As compared to a plurality of copies of the broadcast initiation package being transmitted by the sender device 820—one for each of the recipient devices 825—only a single broadcast package 890 may be transmitted, with the messaging system 750 duplicating the broadcast package 890 for transmission to the recipient devices 825.

The sender broadcast encryption key 875 may be used for future group broadcasts between the members of the broadcast group, which comprises the sender device 820 and the recipient devices 825. In some embodiments, once a particular user and client device initiates a group messaging conversation with a particular messaging group the all the members of the broadcast group may use the shared broadcast encryption key 875. In other embodiments, each member of the broadcast group may use its own broadcast encryption key that it distributes to the other members of the broadcast group using the techniques described herein.

In some embodiments, the security component 850 may progress the sender broadcast encryption key 875 according to an encryption key progression function. The encryption key progression function may comprise the progressive application of an encryption key progression hash after each transmission of a broadcast package. A hash function may define a one-way mathematical transformation in which the input to the function cannot be derived—or, at least, cannot be derived without impractical computation power and time—from the output to the hash function. The hash function may be applied to the current sender broadcast encryption key 875 for one broadcast package to determine the sender broadcast encryption key 875 for the next broadcast package. As a result, if an iteration of the sender broadcast encryption key 875 is revealed at a particular point in time, only broadcast packages sent at are beyond that point in time may be decrypted, with previous broadcast packages using iterations of the sender broadcast encryption key that cannot be derived from the revealed key. As such, agent client devices added to the group message thread after its initiating may be provided a history for the message thread by an agent client device that was in the group message thread for its entirety.

The messaging system 750 may maintain a registry of messaging broadcast groups. The messaging component 840 may therefore register the broadcast group with the messaging system 750 prior to transmission of the broadcast package 890 so as to be able to address the broadcast package 790 to the recipient devices 825 with the messaging system 750. The messaging component 840 may transmit a broadcast group registration request to the messaging system 750 and receive a group identifier from the messaging system 750 in response, the group identifier identifying the broadcast group with the messaging system 750. Each of the recipient devices 825 and/or users of the recipient devices 825 may be associated with an identifier, with the broadcast group registration request listing the identifiers for the recipient devices 825 to identify the recipient devices 825 for inclusion in the group. This group identifier may be available for use by any of the devices in the broadcast group, including both the sender device 820 and all of the recipient devices 825, to address messages to other members of the broadcast group. The messaging component 840 may address the broadcast package 890 to the broadcast group using the received group identifier. The messaging component 840 may include the group identifier in the broadcast initiation package to configure the recipient devices 825 for communication with the broadcast group. Where the broadcast group was initially created by another device in the broadcast group, the group identifier may instead have been received by the sender device 820 in a broadcast initiation package sent by another client device in the broadcast group, such as one of the recipient devices 825.

The messaging component 840 may be operative to receive a group member addition request from a user messaging interface. Alternatively, the messaging component 840 may receive a group member addition notification from the messaging system 750. A group member addition request or a group member addition notification may correspond to an additional recipient device to be added to the broadcast group. As received from a user messaging interface, a group member addition request may comprise a request from the user of the sender device 820 to include another user's device in the broadcast group. As received from the messaging system 750, a group member addition notification may comprise a request from a user of another device in the broadcast group to include another user's device in the broadcast group.

The messaging component 840 may be operative to generate an additional member broadcast initiation package, which may be similar to the broadcast initiation package. The additional member broadcast initiation package may contain the sender broadcast encryption key 875. Where encryption key progression is used, the sender broadcast encryption key 875 may be included by including the iteration of the sender broadcast encryption key 875 reached at that point in the encryption key progression. As such, the additional member of the broadcast group may be able to read any message included in the additional member broadcast initiation package and any future message sent to the broadcast group, but not be able to retroactively decrypt previous messages sent to the broadcast group and encrypted with previous iterations of the sender broadcast encryption key 875.

The messaging component 840 may be operative to transmit the additional member broadcast initiation package to the additional recipient device, wherein the additional member broadcast initiation package is encrypted for transmission to the recipient device according to an additional-member-recipient-device-specific encryption key. The additional-member-recipient-device-specific encryption key may be specifically associated with the additional recipient device, similar to the recipient-device-specific encryption key used for the recipient devices 825. The additional-member-recipient-device-specific encryption key may be received by the sender device 820 from the messaging system 750. The additional-member-recipient-device-specific encryption key may comprise an asymmetric encryption key or a symmetric encryption key.

The messaging component 840 may receive an additional group broadcast message via a user messaging interface. The sender device 820 may refrain from providing the sender broadcast encryption key 875 to an additional recipient device until the user of the sender device 820 actually sends a message to the broadcast group. An additional group broadcast message may therefore comprise at least one of a text segment or media item addressed to the broadcast group including the additional recipient device, the additional member broadcast initiation package containing the additional group broadcast message, the additional member broadcast initiation package generated in response to receiving the additional group broadcast message via the user messaging interface.

The messaging component 840 may transmit this additional group broadcast message, the first message broadcast by the sender device 820 to the broadcast group since the addition of the additional recipient device, using the additional member broadcast initiation package that configures the additional recipient device to decrypt broadcast messages for this broadcast group from the sender device 820. The messaging component 840 may thereby configure the additional recipient device to receive future broadcast packages from the sender device 820 using the same package as delivers the additional group broadcast message. The other members of the broadcast group may receive the additional group broadcast message via a broadcast package as they are already configured to decrypt such using the sender broadcast encryption key 875. It will be appreciated that where multiple additional members are added to the broadcast group that multiple additional member broadcast initiation packages may be sent to multiple additional recipient devices associated with the multiple additional members, with each of the multiple additional member broadcast initiation packages encrypted according to encryption keys specific to each of the multiple additional recipient devices.

Members may be removed from the broadcast group as well as added. The messaging component 840 may receive a group member removal request from a user messaging interface. Alternatively, the messaging component 840 may receive a group member removal notification from the messaging system 750, with the group member removal notification originating from the user of another client device in the broadcast group removing one or more members of the broadcast group. A group member removal request may be performed by, without limitation, an administrator client device 405 deauthorizing an agent client device from accessing a message thread. This may be performed, for example, where an agent is removed from a multi-agent entity. However, it may also be performed where an agent is simply unassigned from a message thread with a user.

Unfortunately, if a removed client device were to have access to a broadcast package sent to the broadcast group by the sender device 820 encrypted using the sender broadcast encryption key 875 it would be able to decrypt the broadcast package. Even where encryption progression is used, the removed client devices could continue to progress the encryption key and decrypt broadcast packages. As such, the sender device 820 may reset its group communication through the use of a replacement sender broadcast encryption key that is distinct from the sender broadcast encryption key 875 and any progression of the sender broadcast encryption key 875 so as to prevent the removed client devices from decrypting any future broadcast packages. As such, the security component 850 may replace the sender broadcast encryption key 875 with a replacement sender broadcast encryption key in response to the received group member removal request or the received group member removal notification.

A broadcast initiation package may comprise an encrypted contents portion and an unencrypted envelope portion. The unencrypted envelope portion may contain addressing information identifying the recipient of the broadcast initiation package. The addressing information for a recipient device may comprise a user identifier associated with a recipient device and/or the user of the recipient device. The unencrypted envelope portion may contain information identifying the sender device 820 and/or the user of the sender device 820 to the messaging system 750. The unencrypted envelope portion may contain information authorizing the sender device 820 to use the messaging system 750. In some embodiments, information authorizing the sender device 820 to use the messaging system 750 may be encrypted according to credentials to authenticate the sender device 820, such as by encrypting at least some portion of the broadcast initiation package using a private key, the corresponding public key to which is stored by the messaging system 750 for identifying the sender device 820. The encrypted contents portion may include the sender broadcast encryption key 875 and the group broadcast message, if any. The encrypted contents portion may be encrypted according to the recipient-device-specific encryption key for each recipient device.

A broadcast package 890 may comprise an encrypted contents portion and an unencrypted envelope portion. The unencrypted envelope portion may contain addressing information identifying the broadcast group to receive the broadcast package 890. The addressing information for a recipient device may comprise a group identifier associated with the broadcast group. The unencrypted envelope portion may contain information identifying the sender device 820 and/or the user of the sender device 820 to the messaging system 750. The unencrypted envelope portion may contain information authorizing the sender device 820 to use the messaging system 750. In some embodiments, information authorizing the sender device 820 to use the messaging system 750 may be encrypted according to credentials to authenticate the sender device 820, such as by encrypting at least some portion of the broadcast initiation package using a private key, the corresponding public key to which is stored by the messaging system 750 for identifying the sender device 820. The encrypted contents portion may include a broadcast message to be sent to the broadcast group.

It will be appreciated that the unencrypted portion of a broadcast initiation package or a broadcast package 890 may be modified by the messaging system 750 during transmission. Information may be added, removed, or modified in the storage and transmission of the broadcast initiation package and the broadcast package 890 so as to further the activities of the end-to-end encrypted communication.

Figure 9:
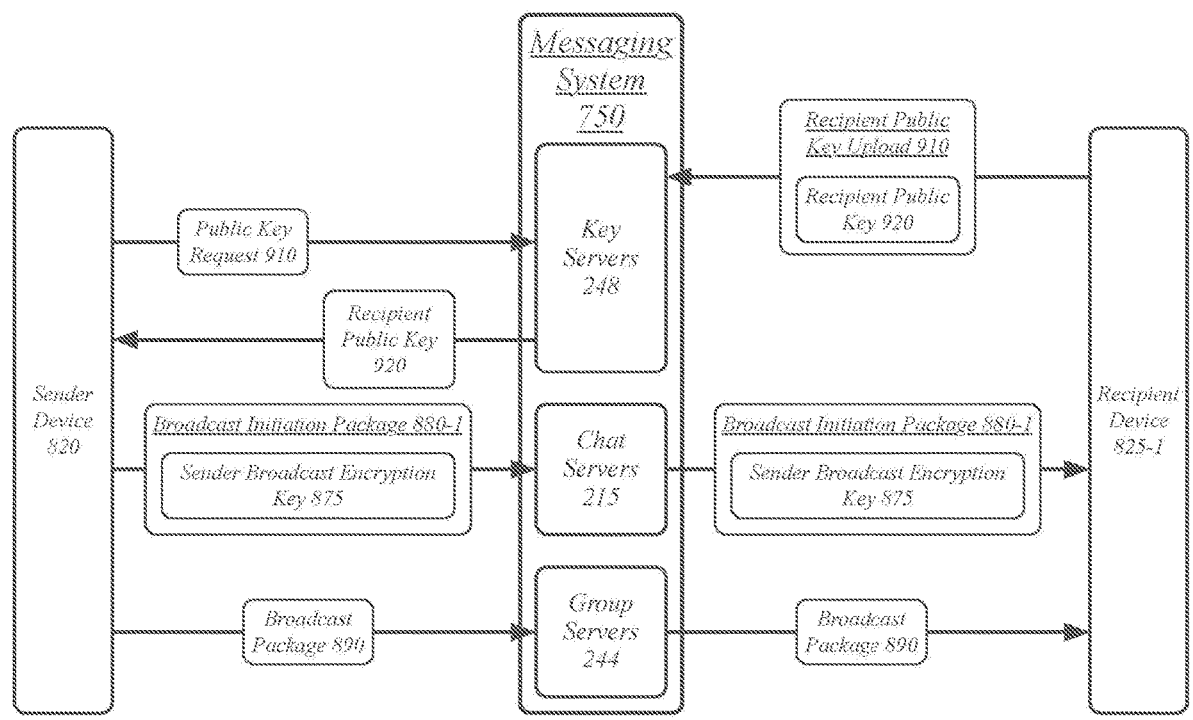
FIG. 9 illustrates an embodiment of a messaging system assisting a group broadcast.

FIG. 9 illustrates an embodiment of a messaging system 750 assisting a group broadcast. The messaging system 750 may include key servers 243, chat servers 215, and group servers 244, as described with reference to FIG. 2.

A recipient device 825-1 may submit a recipient public key upload 910 to the key servers 243 of the messaging system 750. The recipient public key upload 910 may be performed during an initial configuring of a messaging application 830 to configure the messaging system 750 with public keys for distribution to other client. The recipient public key upload 910 may be performed occasionally to refresh the pool of public keys available to the messaging system 750 for distribution to client devices looking to contact the recipient device 825-1. The recipient public key upload 910 may comprise a plurality of public keys to which the recipient device 825-1 has the corresponding private key which it keeps secret in a repository on the recipient device 825-1. This may generally be performed by all the client devices using the messaging system 750 to empower the messaging system 750 to assist other client devices in engaging in secure communication. The key servers 243 may store a plurality of public keys received in the recipient public key upload 910 in a key store. The recipient device

825-1 may associate each of the plurality of public keys in the recipient public key upload 910 with a public key identifier for use in identifying which of the public keys was used by a sender device to encrypt a message sent to the recipient device 825-1.

The sender device 820 may transmit a public key request 910 to the key servers 243. The public key request 910 may identify the recipient device 825-1 for which a public key is requested. The key servers 243 may return a particular recipient public key 920 from the recipient public key upload 910 to the sender device 820 in response to the public key request 910. It will be appreciated that the submission of a recipient public key upload 910 to the key servers 243 and the retrieval of the recipient public key 920 from the key servers 243 may comprise communication with a particular one or more key servers of a plurality of key servers 243 rather than the direct involvement of all of the plurality of key servers 243.

The sender device 820 may transmit the broadcast initiation package 880-1 containing the sender broadcast encryption key 875 to the chat servers 215. The chat server 215 may be specifically directed to one-to-one messaging communications and may not perform fan-out of group communications. The broadcast initiation package 880-1 may be encrypted using the recipient public key 920 received from the key servers 243 in response to the public key request 910. If the recipient device 825-1 is online when the broadcast initiation package 880-1 is received the messaging system 750 may immediately forward the broadcast initiation package 880-1 to the recipient device 825-1. In some embodiments, the broadcast initiation package 880-1 may still move through a message queue to be processed in turn by the chat servers 215. If the recipient device 825-1 is offline when the broadcast initiation package 880-1 is received by the chat servers 215 the chat servers 215 may store the broadcast initiation package 880-1 until the recipient device 825-1 is available and transmit the broadcast initiation package 880-1 to the recipient device 825-1 once it becomes available. The chat servers 215 may be used for the transmission of the broadcast initiation packages 880 due to the broadcast initiation packages 880 being sent as one-to-one communications rather than using the messaging system 750 to perform fan-out of the contained sender broadcast encryption key 275. It will be appreciated that the submission of a broadcast initiation package 880 to the chat servers 215 and the transmission of the broadcast initiation packages 880 from the chat servers 215 may comprise communication with a particular one or more chat servers of a plurality of chat servers 215 rather than the direct involvement of all of the plurality of chat servers 215.

The group servers 244 may receive a broadcast package 890 from the sender device 820. In some cases, the sender device 820 or another client device may register a broadcast group with the group servers 244 prior to the transmission of the broadcast package 890, such as by specifying a list of recipient devices or user accounts with identifiers for the recipient devices or user accounts. In some cases, the sender device 820 may include the list of recipient devices or user accounts in the broadcast package 890 to register the broadcast group with the same network transmission used to transmit the broadcast package 890. The group servers 244 may assign a group identifier to the broadcast group and empower the sender device 820 and recipient devices 825 to address messages to the broadcast group using the assigned group identifier.

The group servers 244 may determine the recipient devices 825, including the recipient device 825-1, for reception of the broadcast package 890. The group servers 244 may transmit the broadcast package 890 to any of the recipient devices 825 that are currently online—with potentially a delay for queuing—and may store the broadcast package 890 for transmission to any of the recipient devices 825 that are offline, transmitting the broadcast package 890 to the offline recipient devices once they come online. It will be appreciated that the submission of a broadcast package 890 to the group servers 244 and the transmission of the broadcast package 890 from the group servers 244 may comprise communication with a particular one or more group servers of a plurality of group servers 244 rather than the direct involvement of all of the plurality of group servers 244.

Where a broadcast package 890 from a sender device 820 is addressed to a list of agents, the group servers 244 may check the list of agents against the list of agents for the multi-agent entity in the agent mapping repository 415. The list of agents in the broadcast package 890 may be checked to confirm both that the listed agents are both still associated with the multi-agent entity and still assigned to the message thread with the user. Any listed agent that is either not associated with the multi-agent entity or not assigned to the message thread is prevented from receiving the broadcast package 890 by refraining from forwarding the broadcast package 890 to the agent client device for the un-associated or on-assigned agent. Such a removal of an agent association or agent unassignment is requested by an administrator client device 405 and recorded in the agent mapping repository 415. When such a removal or unassignment is performed, the sender client device 820 may be notified to update the list of recipients that it should address when communicating with the multi-agent entity.

Figure 10:
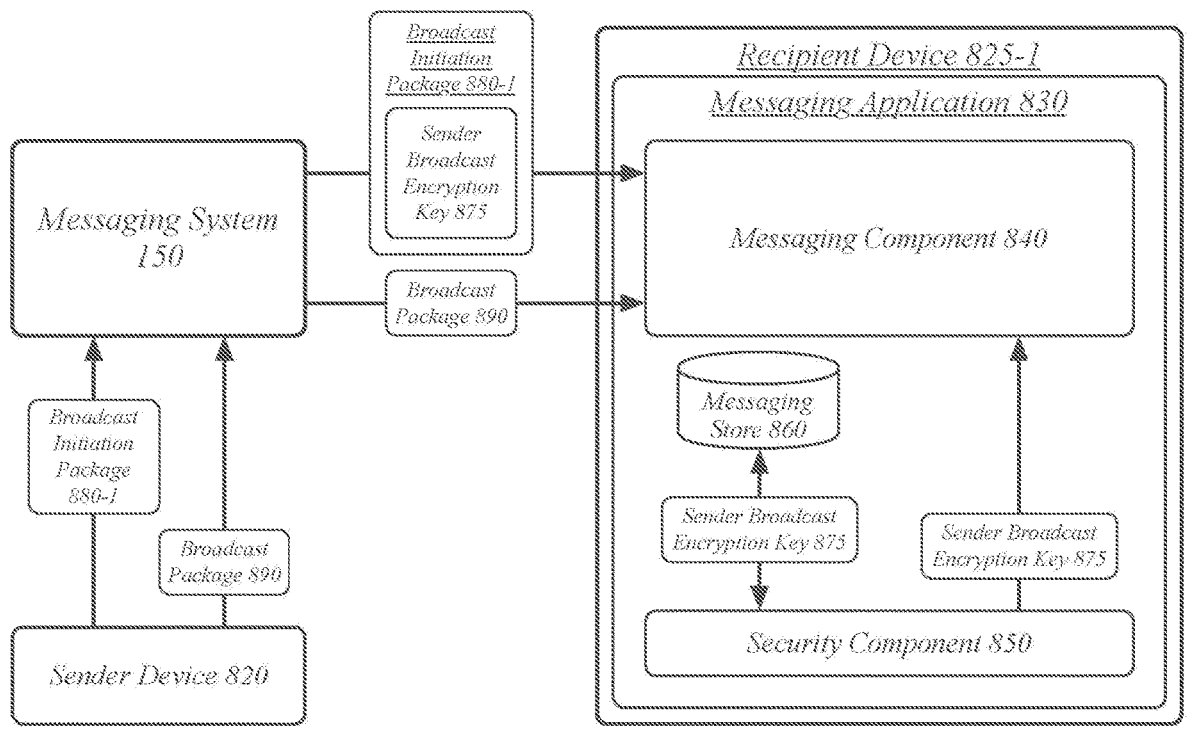
FIG. 10 illustrates an embodiment of recipient device receiving a group broadcast.

FIG. 10 illustrates an embodiment of recipient device 825-1 receiving a group broadcast. The recipient device 825-1 may serve as a representative example of the configuration and operation of all of the plurality of recipient devices 825.

The recipient device 825-1 may execute an instance of the same messaging application 830 used by the sender device 820. In other embodiments, an alternative messaging application may be used, such as where the messaging system 750 supports the use of multiple messaging clients, such as third-party clients, multi-platform messaging clients, and other techniques for the use of alternative messaging clients. The messaging client 830 on the recipient devices 825-1 may comprise a messaging component 840 and security component 850.

The messaging component 840 may be operative to receive a broadcast initiation package 880-1 at the recipient device 825-1 from a sender device 820. The broadcast initiation package 880-1 may be encrypted according to a recipient-device-specific encryption key specific to the recipient device 825-1. The sender device 820 may be associated with a sender identifier, the sender identifier received in the broadcast initiation package 880-1 to identify the sender device 820.

The messaging component 840 may be operative to extract a sender broadcast encryption key 875 from the broadcast initiation package 880-1, the sender broadcast encryption key 875 for use by the sender device 820 in encrypting messages for transmission to the broadcast group with the messaging system 750. The messaging component 840 may extract a group identifier from the broadcast initiation package 880-1, the group identifier identifying a broadcast group with the messaging system 750.

A security component 850 may be operative to store the sender broadcast encryption key 875 in association with the sender identifier and the broadcast group identifier in a messaging store 860. The messaging store 860 may store a messaging history for the recipient device 825-1. The messaging store 860 may therefore store a messaging history for the group conversation for the broadcast group. The security component 850 may store the sender broadcast encryption key 875 in the messaging store 860 in association with the messaging history for the group conversation for the broadcast group. The security component 850 may store a sender broadcast encryption key for each member of the broadcast group that has transmitted a message to the broadcast group. The security component 850 may not store a sender broadcast encryption key for those members of the broadcast group that have not yet transmitted a message as the end-to-end encrypted communication system 700 may only use network bandwidth to exchange sender broadcast encryption keys once a member attempts to broadcast to the broadcast group.

The messaging component 840 may be operative to receive a broadcast package 890 from a retransmission server, the broadcast package associated with the sender identifier and the group identifier. The security component 850 on the recipient device 825-1 may retrieve the sender broadcast encryption key 875 from the messaging store 860 based on the sender identifier and the group identifier. The messaging component 840 may decrypt the broadcast package 890 using the sender broadcast encryption key 875 retrieved from the messaging store 860.

Figure 11A:
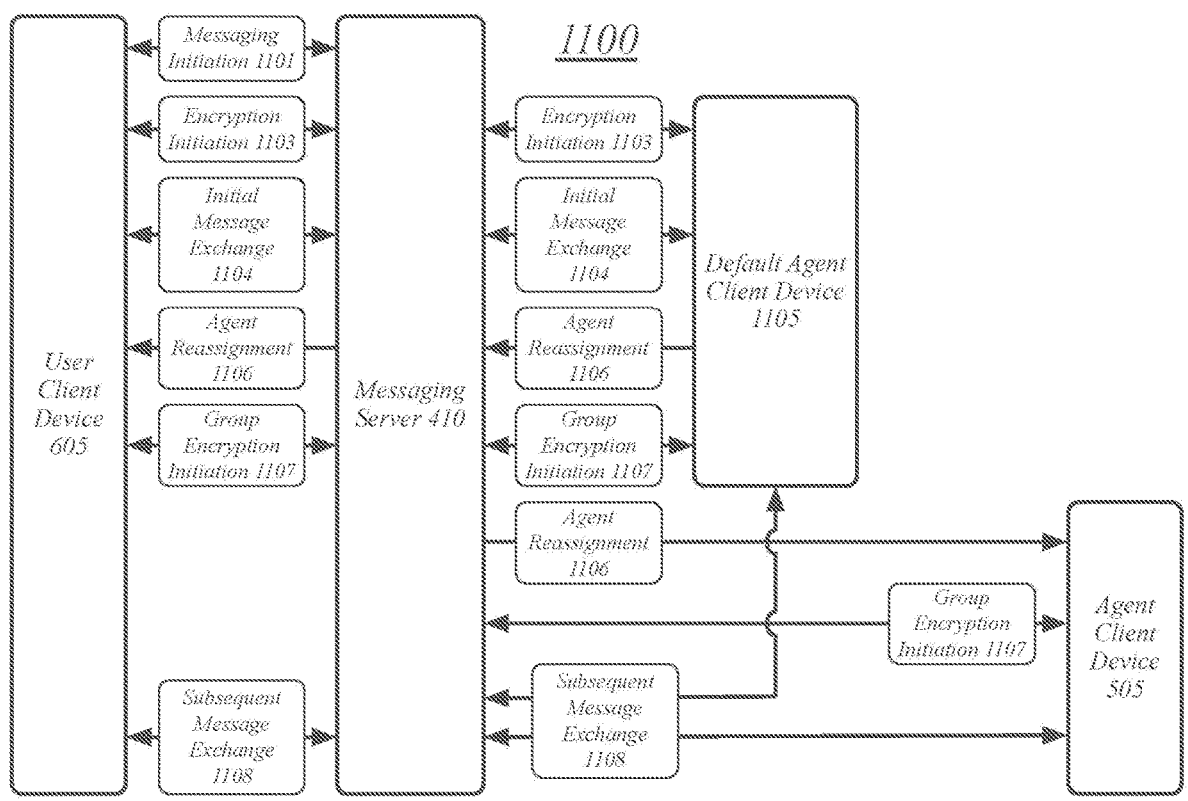
FIG. 11A illustrates an embodiment of a forwarding-based logic flow with multi-agent labelling for a message thread.

FIG. 11A illustrates an embodiment of a forwarding-based logic flow 1100 with multi-agent labelling for a message thread.

The user client device 605 may perform a messaging initiation 1101 with a multi-agent entity. The messaging initiation 1101 comprises a request to engage in messaging with a multi-agent entity. The user client device 605 identifies to the messaging server 410 the multi-agent entity the user wishes to engage with, such as by specifying a messaging identifier for the multi-agent entity. The user client device 605 may receive a default client device identifier for a default agent client device 1105 for the multi-agent entity. The user client device 605 may further receive a name for the multi-agent entity as part of the messaging initiation 1101, the name for the multi-agent entity used to label the message thread with the default agent client device 1105. The name for the multi-agent entity may further be used to label individual messages received at the user client device 605 from agent for the multi-agent entity.

In an alternative scenario, a messaging initiation 1101 may be performed by an agent client device, such as a default agent client device 1105. The messaging initiation 1101 may be performed as described, but with the requesting agent client device as the default agent client device 1105 in the establishment of one-to-one encryption. In some embodiments, only administrator client devices may initiate messaging with a user.

The user client device 605 then performs an encryption initiation 1103 via the messaging server 410 with the default agent client device 1105. The encryption initiation 1103 establishes a one-to-one end-to-end encrypted communication channel with the default agent client device 1105 via an exchange of encryption keys.

The user client device 605 and the default agent client device 1105 may then engage in an initial message exchange 1104 over the one-to-one end-to-end encrypted communication channel established by the encryption key exchange in the encryption initiation 1103.

The default agent client device 1105 may then perform an agent reassignment 1106. The agent reassignment 1106 instructs the messaging server 410 that another agent client device 505 should be included in the message exchange. The agent reassignment 1106 initiates a group encryption initiation 1107 with the user client device 1107.

The user client device 605, default agent client device 1105, and other agent client device 505 perform a group encryption initiation 1107 in response to the agent reassignment 1106. This group encryption initiation 1107 provides for the forwarding of messages in the group message thread between the user client device 605, default agent client device 1105, and other agent client device 505.

The agent client device 505 is informed of the agent reassignment 1106. This may include sending a message, notification, or other communication to the agent using the agent client device 505 that the agent is now responsible for serving the user of the user client device 605.

The user and agent may thereafter engage in a subsequent message exchange 1108 via the user client device 605 and agent client device 505. The subsequent message exchange 1108 is an end-to-end encrypted group message thread using the end-to-end encrypted group message thread techniques described herein. The default agent client device 1105 continues to receive the subsequent message exchange 1108, such as to empower the user of the default agent client device 1105 to monitor and participate in the subsequent message exchange 1108 if they so desire.

The message thread display on the user client device 605 may continue to be labelled with the name of the multi-agent entity through the transition to a group message thread and the subsequent message exchange 1108 including the assigned agent client device 505.

Figure 11B:
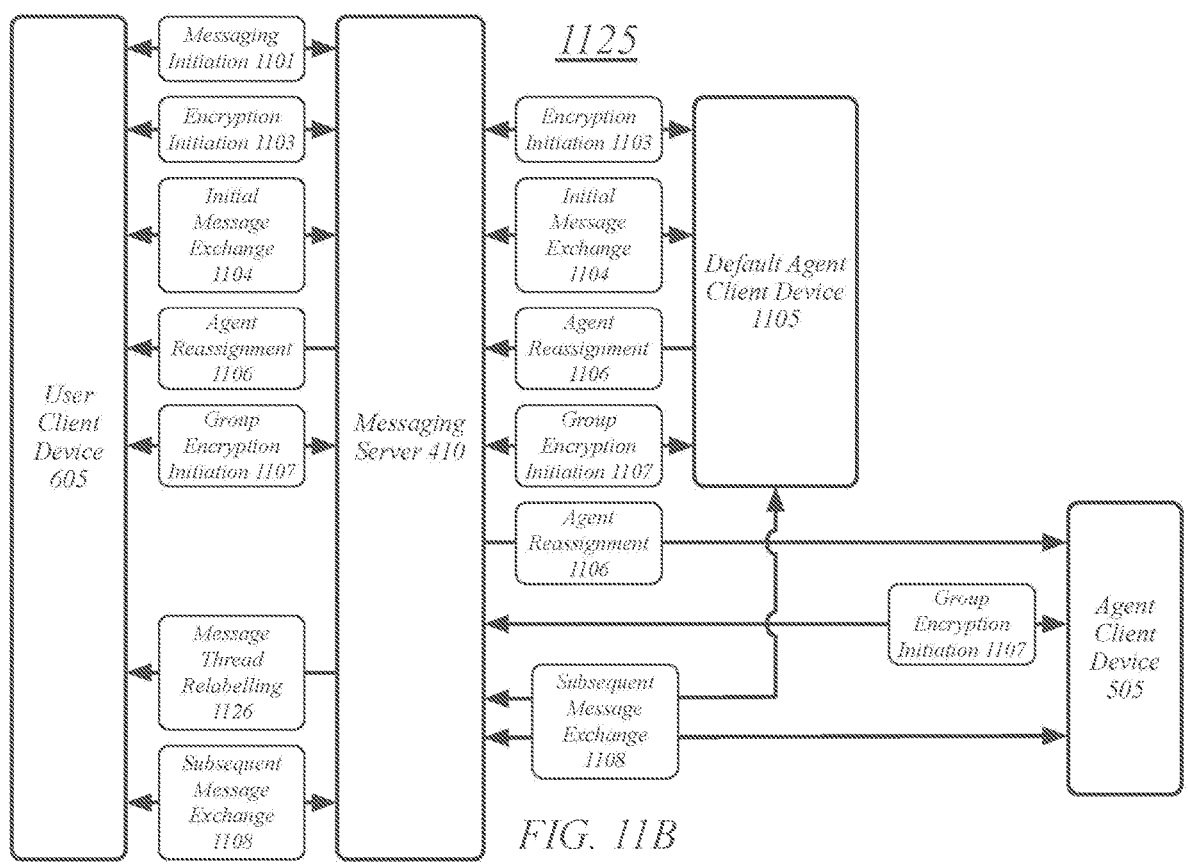
FIG. 11B illustrates an embodiment of a forwarding-based logic flow with individual-agent labelling for a message thread.

FIG. 11B illustrates an embodiment of a forwarding-based logic flow 1125 with individual-agent labelling for a message thread.

Many of the steps for a forwarding-based logic flow 1125 with individual-agent labelling for a message thread may be the same as steps for a forwarding-based logic flow 1100 with multi-agent labelling for a message thread. It will be appreciated that the same techniques may be except where different techniques are described herein. Specifically, a messaging initiation 1101, encryption initiation 1103, initial message exchange 1104, agent reassignment 1106, group encryption initiation 1107, and subsequent message exchange 1108 may be performed as described with reference to FIG. 11A except as noted.

In one embodiment, in the messaging initiation 1101, the user client device 605 may be provided with a name for the default agent using the default agent client device 1105 instead of a name for the multi-agent entity. This name for the default agent may be used to both label the message thread with the multi-agent entity and the individual messages received from the default agent. The message thread may then be relabeled according to a message thread relabeling 1126 to use a name for the assigned agent for assigned agent client device 505.

Alternatively, in another embodiment, the name for the multi-agent entity may be used to label the message thread with the multi-agent entity, but with the individual messages labelled according to the individual agent that sent them to the user client device 605. As such, instead of a message thread relabeling 1126 for an overall label for the message thread, the message thread relabeling 1126 may provide the multi-agent entity name for use in labelling the group message thread and the individual name of the assigned agent for use in labelling the individual messages received from the assigned agent.

Figure 11C:
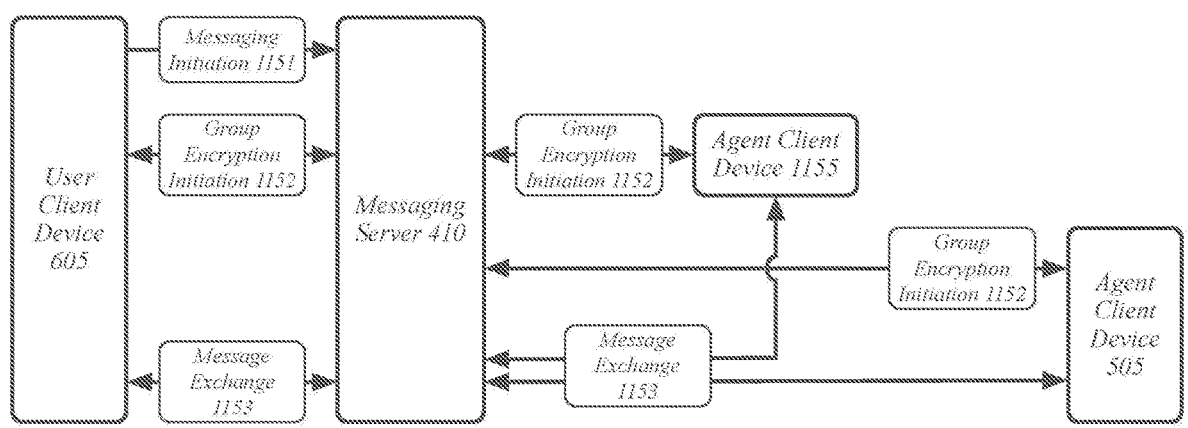
FIG. 11C illustrates an embodiment of a global-view-based logic flow for a message thread.

FIG. 11C illustrates an embodiment of a global-view-based logic flow 1150 for a message thread.

Messaging for a multi-agent messaging system 100 may, in some embodiments, use a global view in which every agent for a multi-agent entity is empowered to access every message thread. In these embodiments, the group encryption initiation 1152 is performed directly in response to the messaging initiation 1151 with the multi-agent entity.

The messaging server 410 receive a messaging initiation 1151 from the user client device 605. The messaging initiation 1101 comprises a request to engage in messaging with the multi-agent entity. The user client device 605 identifies to the messaging server 410 the multi-agent entity the user wishes to engage with, such as by specifying a messaging identifier for the multi-agent entity.

In an alternative scenario, a messaging initiation 1151 may be performed by the agent client device 1155. The messaging initiation 1101 may be performed as described, but with the requesting agent client device 1155 included in the list of initial agents included in the group message thread whether or not the requesting agent client device 1155 is a default agent client device. In some embodiments, only administrator client devices may initiate messaging with a user.

The user client device 605, first agent client device 1155, other agent client device 505, and possibly additional agent client devices perform a group encryption initiation 1152 in response to the messaging initiation 1151. The group encryption initiation 1152 may be performed with the user client device 605 and every agent client device for the multi-agent entity. Alternatively, the group encryption initiation 1152 may be performed with the user client device 605 and every default agent client device for the multi-agent entity. This group encryption initiation 1152 provides for the forwarding of messages in the group message thread between the user client device 605, agent client device 1155, other agent client device 505, and any other agent client devices for the multi-agent entity. The agent client devices for the multi-agent entity may then engage in a message exchange 1153 with the user client device 605.

The message thread with the multi-agent entity may be labelled either according to the individual agents that participate in it or according to the multi-agent entity as a whole. Similarly, the individual messages in the message thread may be labelled according to the individual agents that participate in it or according to the multi-agent entity as a whole.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12:
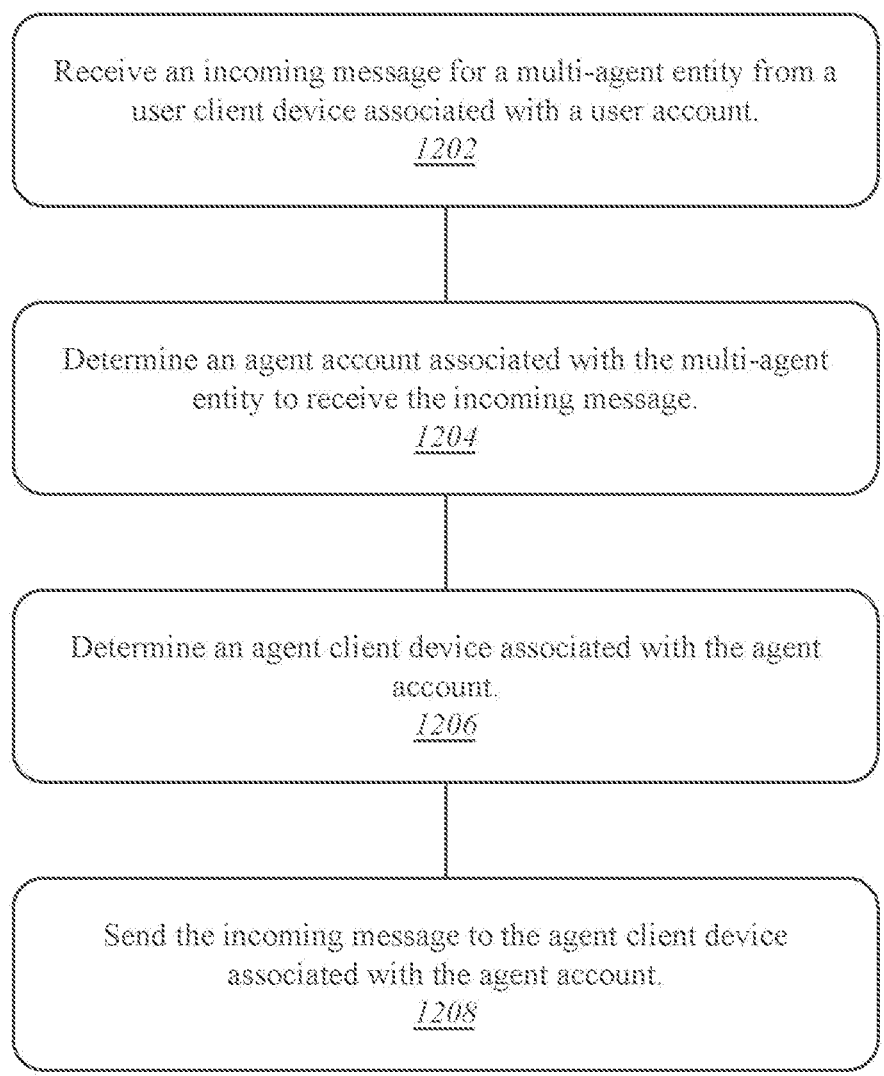
FIG. 12 illustrates an embodiment of a logic flow for the system of FIG. 1.

FIG. 12 illustrates one embodiment of a logic flow 1200. The logic flow 1200 may be representative of some or all of the operations executed by one or more embodiments described herein.

In the illustrated embodiment shown in FIG. 12, the logic flow 1200 may receive an incoming message for a multi-agent entity from a user client device associated with a user account block 1202.

The logic flow 1200 may determine an agent account associated with the multi-agent entity to receive the incoming message at block 1204.

The logic flow 1200 may determine an agent client device associated with the agent account at block 1206.

The logic flow 1200 may send the incoming message to the agent client device associated with the agent account at block 1208.

The embodiments are not limited to this example.

Figure 13:
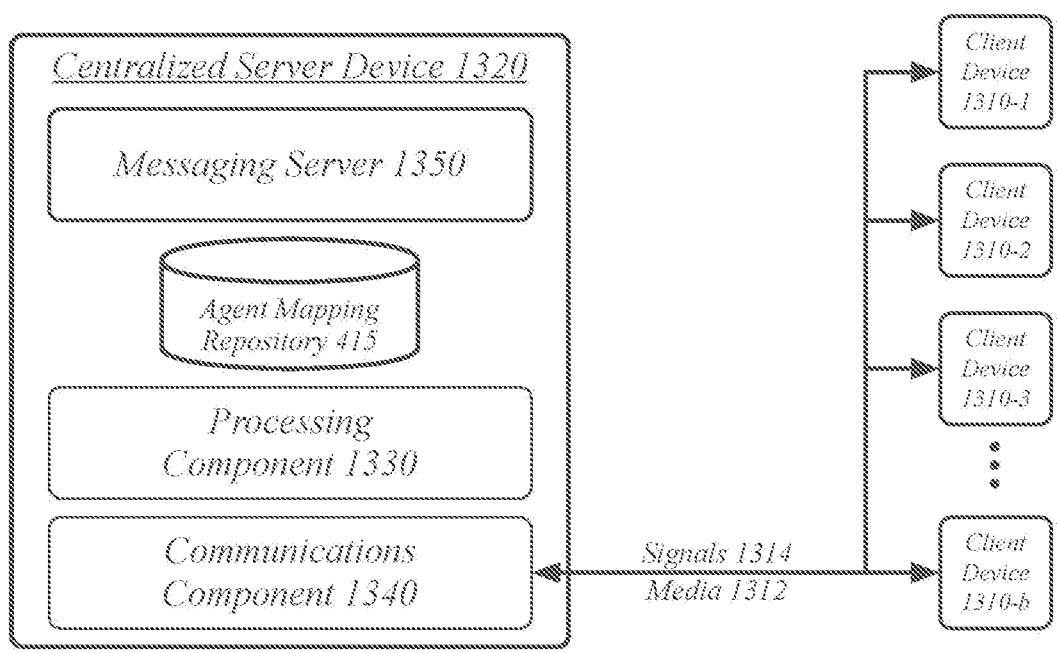
FIG. 13 illustrates an embodiment of a centralized system for the system of FIG. 1.

FIG. 13 illustrates a block diagram of a centralized system 1300. The centralized system 1300 may implement some or all of the structure and/or operations for the multi-agent messaging system 100 in a single computing entity, such as entirely within a single centralized server device 1320.

The centralized server device 1320 may comprise any electronic device capable of receiving, processing, and sending information for the multi-agent messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 1320 may execute processing operations or logic for the multi-agent messaging system 100 using a processing component 1330. The processing component 1330 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 1320 may execute communications operations or logic for the multi-agent messaging system 100 using communications component 1340. The communications component 1340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1312 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 1320 may communicate with other devices over a communications media 1312 using communications signals 1314 via the communications component 1340. The devices may be internal or external to the centralized server device 1320 as desired for a given implementation.

The centralized server device 1320 may execute a messaging server 1350. The messaging server 1350 may comprise a messaging server for a messaging system 110. The messaging server 1350 may provide messaging operations for a plurality of client devices 1310, receiving and sending messages between the client devices 1310. The client devices 1310 may correspond to one or more of a smartphone device 150, tablet device 160, personal computer device 170, and/or any other client device. The centralized server device 1320 may comprise the agent mapping repository 415 as a local data store.

Figure 14:
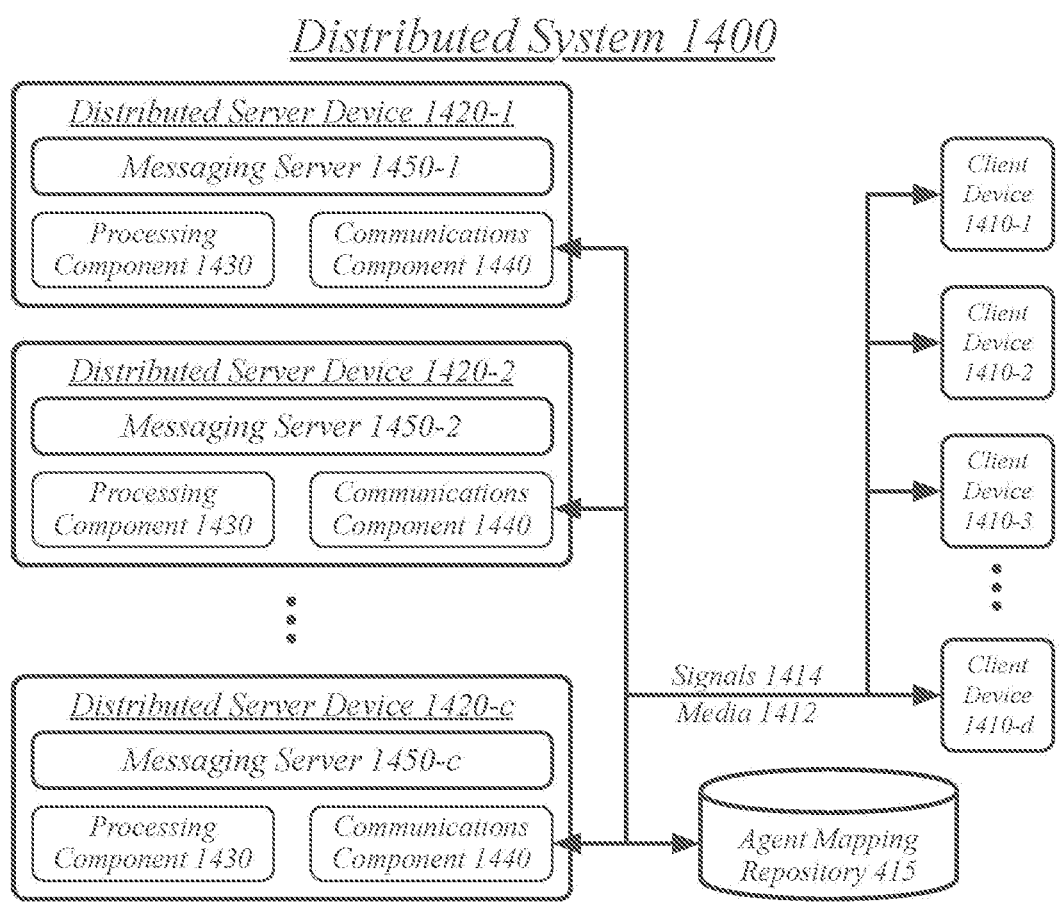
FIG. 14 illustrates an embodiment of a distributed system for the system of FIG. 1.

FIG. 14 illustrates a block diagram of a distributed system 1400. The distributed system 1400 may distribute portions of the structure and/or operations for the multi-agent messaging system 100 across multiple computing entities. Examples of distributed system 1400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1400 may comprise a plurality of distributed server devices 1420. In general, the distributed server devices 1420 may be the same or similar to the centralized server device 1420 as described with reference to FIG. 13. For instance, the distributed server devices 1420 may each comprise a processing component 1430 and a communications component 1440 which are the same or similar to the processing component 1330 and the communications component 1340, respectively, as described with reference to FIG. 13. In another example, the distributed server devices 1420 may communicate over a communications media 1412 using communications signals 1414 via the communications components 1440.

The distributed server devices 1420 may comprise or employ one or more server programs that operate to perform various methodologies in accordance with the described embodiments. In one embodiment, for example, the distributed server devices 1420 may each execute one of a plurality of messaging servers 1450. The messaging servers 1450 may comprise messaging servers for a messaging system 110. The messaging servers 1450 may provide messaging operations for a plurality of client devices 1410, receiving and sending messages between the client devices 1410. The client devices 1410 may correspond to one or more of a smartphone device 150, tablet device 160, personal computer device 180, and/or any other client device. The distributed server devices 1420 may communicate with the agent mapping repository 415 using the signals 1414 sent over the media 1412. The agent mapping repository 415 may be hosted as a network-accessible data store.

Figure 15:
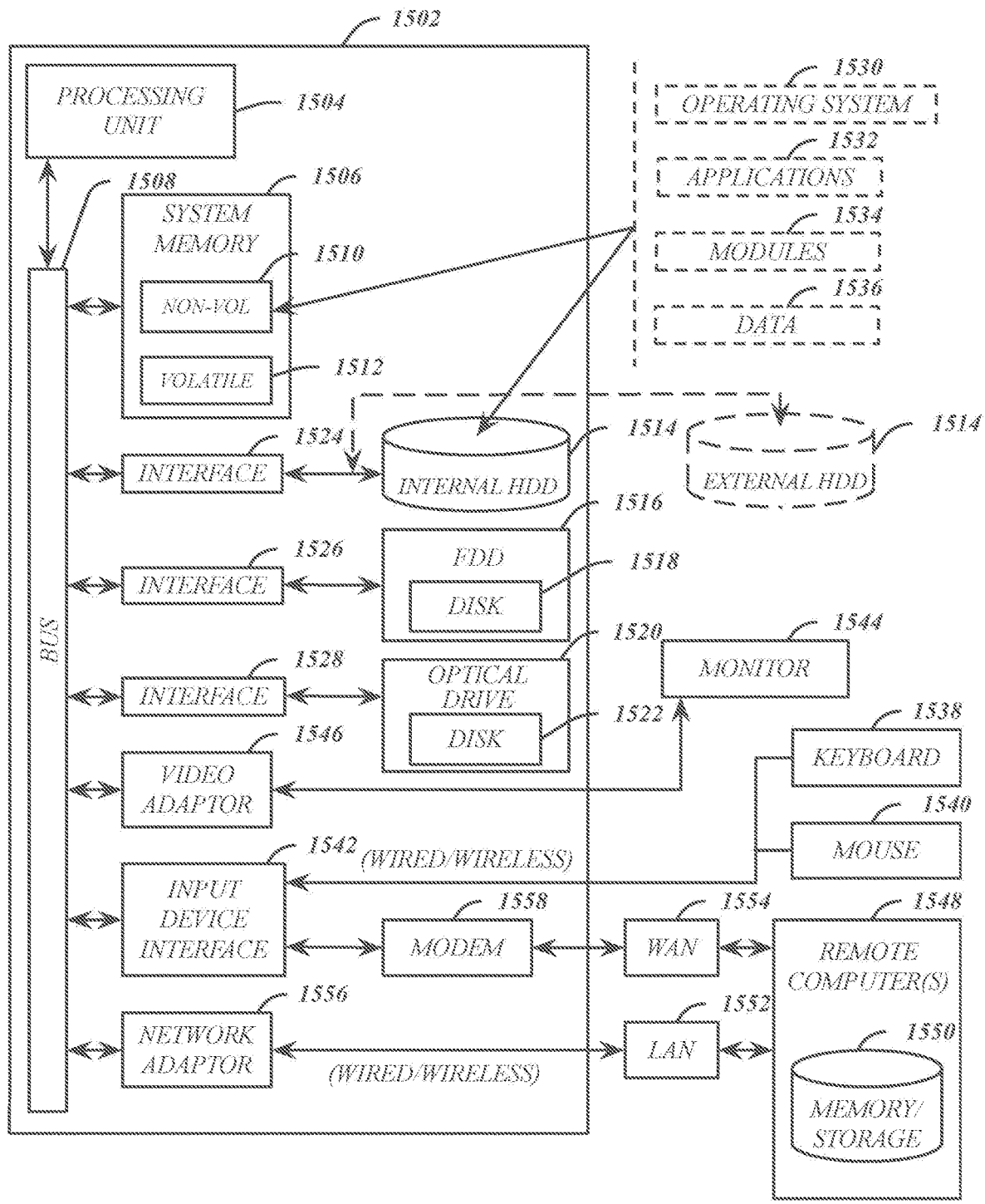
FIG. 15 illustrates an embodiment of a computing architecture.

FIG. 15 illustrates an embodiment of an exemplary computing architecture 1500 suitable for implementing various embodiments as previously described. In one embodiment, the computing architecture 1500 may comprise or be implemented as part of an electronic device. Examples of an electronic device may include those described with reference to FIG. 13, 14, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors, including without limitation an Athlon®, Duron® and Opteron® processors; embedded and secure processors; DragonBall® and PowerPC® processors; Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the multi-agent messaging system 150.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor

1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
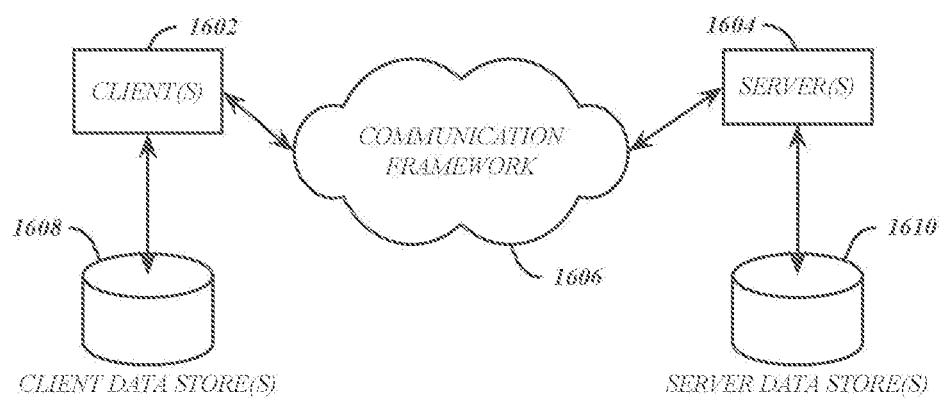
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 comprises includes one or more clients 1602 and servers 1604. The clients 1602 may implement the messaging clients. The servers 1604 may implement the messaging servers. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 17:
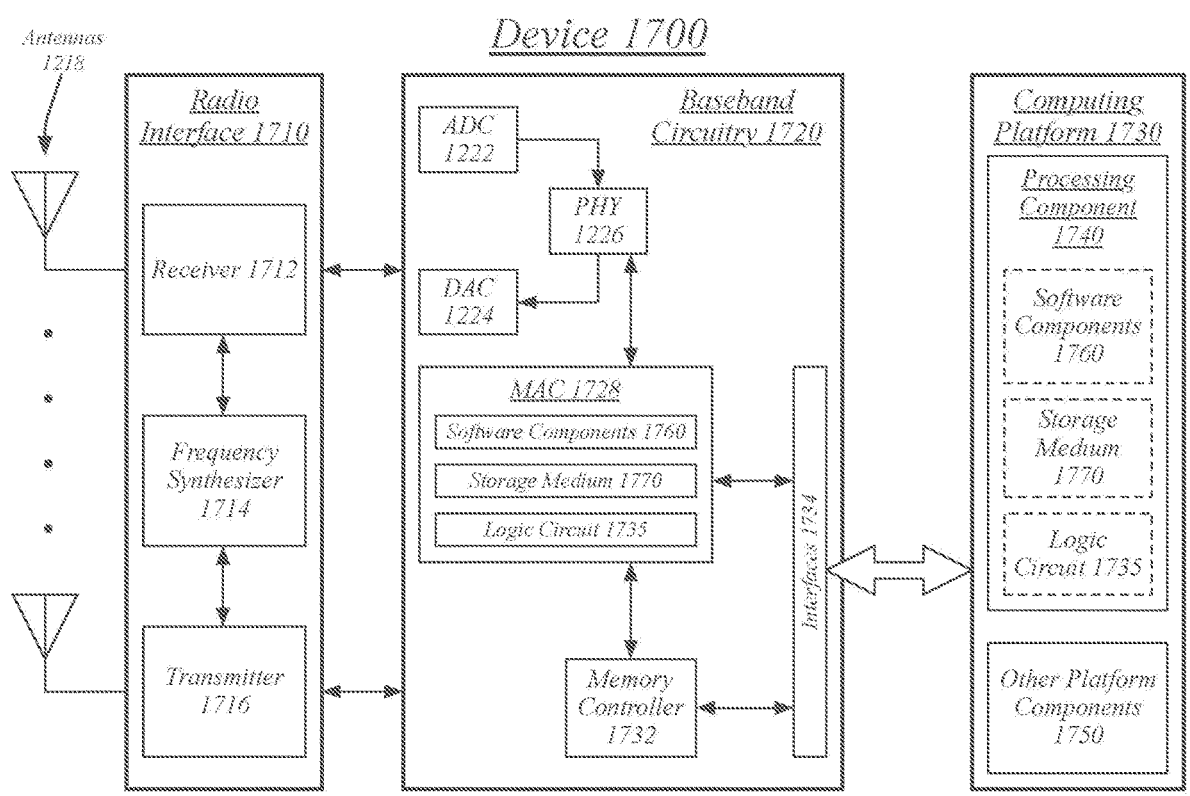
FIG. 17 illustrates an embodiment of a radio device architecture.

FIG. 17 illustrates an embodiment of a device 1700 for use in a multicarrier OFDM system, such as the multi-agent messaging system 100. Device 1700 may implement, for example, software components 1760 as described with reference to multi-agent messaging system 100 and/or a logic circuit 1735. The logic circuit 1735 may include physical circuits to perform operations described for the multi-agent messaging system 100. As shown in FIG. 17, device 1700 may include a radio interface 1710, baseband circuitry 1720, and computing platform 1730, although embodiments are not limited to this configuration.

The device 1700 may implement some or all of the structure and/or operations for the multi-agent messaging system 100 and/or logic circuit 1735 in a single computing entity, such as entirely within a single device. Alternatively, the device 1700 may distribute portions of the structure and/or operations for the multi-agent messaging system 100 and/or logic circuit 1735 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1710 may include, for example, a receiver 1712, a transmitter 1716 and/or a frequency synthesizer 1714. Radio interface 1710 may include bias controls, a crystal oscillator and/or one or more antennas 1718. In another embodiment, radio interface 1710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1720 may communicate with radio interface 1710 to process receive and/or transmit signals and may include, for example, an analog-to-digital converter

1722 for down converting received signals, a digital-to-analog converter 1724 for up converting signals for transmission. Further, baseband circuitry 1720 may include a baseband or physical layer (PHY) processing circuit 1756 for PHY link layer processing of respective receive/transmit signals. Baseband circuitry 1720 may include, for example, a processing circuit 1728 for medium access control (MAC)/data link layer processing. Baseband circuitry 1720 may include a memory controller 1732 for communicating with processing circuit 1728 and/or a computing platform 1730, for example, via one or more interfaces 1734.

In some embodiments, PHY processing circuit 1726 may include a frame construction and/or detection module, in combination with additional circuitry such as a buffer memory, to construct and/or deconstruct communication frames, such as radio frames. Alternatively or in addition, MAC processing circuit 1728 may share processing for certain of these functions or perform these processes independent of PHY processing circuit 1726. In some embodiments, MAC and PHY processing may be integrated into a single circuit.

The computing platform 1730 may provide computing functionality for the device 1700. As shown, the computing platform 1730 may include a processing component 1740. In addition to, or alternatively of, the baseband circuitry 1720, the device 1700 may execute processing operations or logic for the multi-agent messaging system 100 and logic circuit 1735 using the processing component 1740. The processing component 1740 (and/or PHY 1726 and/or MAC 1728) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1730 may further include other platform components 1750. Other platform components 1750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1700 described herein, may be included or omitted in various embodiments of device 1700, as suitably desired. In some embodiments, device 1700 may be configured to be compatible with protocols and frequencies associated one or more of the 3GPP LTE Specifications and/or IEEE 1702.16 Standards for WMANs, and/or other broadband wireless networks, cited herein, although the embodiments are not limited in this respect.

Embodiments of device 1700 may be implemented using single input single output (SISO) architectures. However, certain implementations may include multiple antennas (e.g., antennas 1718) for transmission and/or reception using adaptive antenna techniques for beamforming or spatial division multiple access (SDMA) and/or using MIMO communication techniques.

The components and features of device 1700 may be implemented using any combination of discrete circuitry, application specific integrated circuits (ASICs), logic gates and/or single chip architectures. Further, the features of device 1700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1700 shown in the block diagram of FIG. 17 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an incoming message for a multi-agent entity from a user client device associated with a user account; determining an agent account associated with the multi-agent entity to receive the incoming message; determining an agent client device associated with the agent account; and sending the incoming message to the agent client device associated with the agent account.

A computer-implemented method may comprise receiving an administrator account registration for an administrator account for a multi-agent entity; registering the administrator account as associated with the multi-agent entity; receiving an agent account registration for an agent account for the multi-agent entity; receiving an incoming message for the multi-agent entity from a user client device associated with a user account; and sending the incoming message to an agent client device associated with the agent account based on a message sharing authorization for the agent account by the administrator account.

A computer-implemented method may further comprise receiving a message-thread forward for a message thread between the user account and the administrator account from the administrator account, the message-thread forward specifying the agent account; registering the message thread with the agent account on a messaging server device; receiving the incoming message for the multi-agent entity from the user client device at the messaging server device; and sending the incoming message to the agent client device based on the registering of the message thread with the agent account.

A computer-implemented method may further comprise the incoming message associated with the message thread.

A computer-implemented method may further comprise forwarding a thread forwarding payload from the administrator account to the agent account, the thread forwarding payload comprising security information empowering the agent client device to access the message thread.

A computer-implemented method may further comprise the security information comprising one or more encryption keys, the message encrypted based on an encryption key of the one or more encryption keys.

A computer-implemented method may further comprise relabeling a message thread interface for the message thread on the user client device to indicate the agent account in place of the administrator account in response to the message-thread forward.

A computer-implemented method may further comprise labeling a message thread interface on the user client device to indicate the multi-agent entity.

A computer-implemented method may further comprise the message sharing authorization comprising the agent account registration for the agent account for the multi-agent entity.

A computer-implemented method may further comprise registering the agent account for message sharing authorization of subsequent message threads for the multi-agent entity in response to the agent account registration.

A computer-implemented method may further comprise determining a plurality of last-seen times for a plurality of agent accounts for the multi-agent entity; selecting a most-recent last-seen time of the plurality of last-seen times; and providing the most-recent last-seen time to a message thread interface for the message thread on the user client device to indicate a last-seen time for the multi-agent entity.

An apparatus may comprise an agent management component and a message processing component operative to. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implement method comprising:
    receiving a message from a user at a user client device for a multi-agent entity, the message initiating a message thread between the user and the multi-agent entity;
    determining an administrator user for the multi-agent entity;
    forwarding the message thread to the administrator at an administrator client device;
    facilitating an exchange of security information between the administrator client device and the user client device to create an end-to-end encrypted messaging relationship between the administrator client device and the user client device;
    receiving a message thread forwarding command from the administrator client device to forward the message thread to an agent of the multi-agent entity at an agent client device, the command including a payload containing the security information; and
    forwarding the message thread to the agent client device.

2. The method of claim 1 wherein the security information comprises one or more encryption keys, the method further comprising:
    forwarding the one or more encryption keys from the administrator client device to the agent client device to empower the agent client device to engage in end-to-end encrypted messaging with the user client device.

3. The method of claim 2 wherein forwarding the one or more encryption keys occurs in the context of an end-to-end encrypted messaging session between the administrator client device and the agent client device.

4. The method of claim 1 wherein the messaging thread is expanded to a group messaging thread including one or more other agents.

5. The method of claim 1 wherein the administrator forwards the security information to the one or more other agents.

6. The method of claim 1 wherein the agent receiving the message thread from the administrator is a messaging bot.

7. The method of claim 1 wherein the administrator retrieves the security information from a security information repository on the administrator client device.

8. A system comprising:
    a processor; and
    software, that, when executed by the processor, causes the system to:
        receive a message from a user at a user client device for a multi-agent entity, the message initiating a message thread between the user and the multi-agent entity;
        determine an administrator user for the multi-agent entity;
        forward the message thread to the administrator at an administrator client device;
        facilitate an exchange of security information between the administrator client device and the user client device to create an end-to-end encrypted messaging relationship between the administrator client device and the user client device;
        receive a message thread forwarding command from the administrator client device to forward the message thread to an agent of the multi-agent entity at an agent client device, the command including a payload containing the security information; and
        forward the message thread to the agent client device.

9. The system of claim 8 wherein the security information comprises one or more encryption keys, the software further causing the system to:
    forward the one or more encryption keys from the administrator client device to the agent client device to empower the agent client device to engage in end-to-end encrypted messaging with the user client device.

10. The system of claim 9 wherein forwarding the one or more encryption keys occurs in the context of an end-to-end encrypted messaging session between the administrator client device and the agent client device.

11. The system of claim 8 wherein the messaging thread is expanded to a group messaging thread including one or more other agents.

12. The system of claim 11 wherein the administrator forwards the security information to the one or more other agents.

13. The system of claim 8 wherein the agent receiving the message thread from the administrator is a messaging bot.

14. The system of claim 8 wherein the administrator retrieves the security information from a security information repository on the administrator client device.

15. A non-transitory, computer-readable medium storing software that, when executed by a processor, cause a system to:
    receive a message from a user at a user client device for a multi-agent entity, the message initiating a message thread between the user and the multi-agent entity;
    determine an administrator user for the multi-agent entity;
    forward the message thread to the administrator at an administrator client device;
    facilitate an exchange of security information between the administrator client device and the user client device to create an end-to-end encrypted messaging relationship between the administrator client device and the user client device;

receive a message thread forwarding command from the administrator client device to forward the message thread to an agent of the multi-agent entity at an agent client device, the command including a payload containing the security information; and forward the message thread to the agent client device.

16. The medium of claim 15 wherein the software further causes the system to:

forward the one or more encryption keys from the administrator client device to the agent client device to empower the agent client device to engage in end-to-end encrypted messaging with the user client device.

17. The medium of claim 16 wherein forwarding the one or more encryption keys occurs in the context of an end-to-end encrypted messaging session between the administrator client device and the agent client device.

18. The medium of claim 15 wherein the messaging thread is expanded to a group messaging thread including one or more other agents. the software further causing the system to:

forward the security information to the one or more other agents.

19. The medium of claim 15 wherein the agent receiving the message thread from the administrator is a messaging bot.

20. The medium of claim 15 wherein the administrator retrieves the security information from a security information repository on the administrator client device.

* * * * *